US012756205B2

(12) United States Patent
Gutknecht et al.

(10) Patent No.: US 12,756,205 B2
(45) Date of Patent: Oct. 6, 2026

(54) METHODS AND SYSTEMS FOR MULTI-PHASE AC GENERATION USING INVERTER

(71) Applicant: instagrid GmbH, Ludwigsburg (DE)

(72) Inventors: Philipp Gutknecht, Mönsheim (DE); Julian Dessecker, Ludwigsburg (DE)

(73) Assignee: instagrid GmbH, Ludwigsburg (DE)

( * ) Notice: Subject to any disclaimer, the term of this patent is extended or adjusted under 35 U.S.C. 154(b) by 0 days.

(21) Appl. No.: 19/557,363

(22) Filed: Mar. 5, 2026

(65) Prior Publication Data

US 2026/0196847 A1 Jul. 9, 2026

Related U.S. Application Data

(63) Continuation of application No. PCT/EP2025/058395, filed on Mar. 27, 2025.

(30) Foreign Application Priority Data

Jun. 20, 2024 (EP) .................................... 24183567

(51) Int. Cl.
*H02J 7/06* (2006.01)
*H02J 7/00* (2026.01)

(52) U.S. Cl.
CPC ................ *H02J 7/06* (2013.01); *H02J 7/865* (2026.01); *H02J 2207/20* (2020.01)

(58) Field of Classification Search
CPC ........... H02J 7/06; H02J 7/865; H02J 2207/20
USPC ........................................................ 320/128
See application file for complete search history.

(56) References Cited

U.S. PATENT DOCUMENTS 6,801,019 B2 * 10/2004 Haydock ................. H02J 9/066 322/17
7,330,012 B2 * 2/2008 Ahmad ................. H02M 7/003 701/19
7,768,800 B2 * 8/2010 Mazumder ............ H02M 5/458 363/17

(Continued)

FOREIGN PATENT DOCUMENTS

EP 3965247 A1 9/2022
EP 4564660 A1 * 6/2025 .............. H02J 7/855

(Continued)

OTHER PUBLICATIONS

N. Tak, S. K. Chattopadhyay and C. Chakraborty, "Single-Sourced Double-Stage Multilevel Inverter for Grid-Connected Solar PV Systems," in IEEE Open Journal of the Industrial Electronics Society, vol. 3, pp. 561-581, 2022 (Year: 2022).*

(Continued)

*Primary Examiner* — M Baye Diao
(74) *Attorney, Agent, or Firm* — The Webb Law Firm

(57) ABSTRACT

The present teachings relate to methods of operating an electrical inverter operable to deliver AC electrical power as a second AC power signal, the method including measure a first AC power signal; generating a first tuned signal dependent upon the first AC power signal; determining, using the first tuned signal, a first phase value indicative of phase of the first AC power signal; generating the second AC power signal shifted by a pre-determined first phase-difference value from the first phase value. The present teachings also disclose related products, systems, and software.

20 Claims, 12 Drawing Sheets

(56) References Cited

U.S. PATENT DOCUMENTS

| | | | | |
|---|---|---|---|---|
| 7,839,023 | B2 * | 11/2010 | Jacobson | H02M 7/53871<br>363/43 |
| 8,575,879 | B2 * | 11/2013 | Welchko | H02M 1/32<br>361/84 |
| 8,670,254 | B2 * | 3/2014 | Perreault | H02M 7/797<br>363/71 |
| 8,736,102 | B1 | 5/2014 | Gao et al. | |
| 8,970,159 | B2 * | 3/2015 | Choi | H02P 29/032<br>318/800 |
| 9,035,612 | B2 | 5/2015 | Feuerstack et al. | |
| 9,143,053 | B1 | 9/2015 | Lentine et al. | |
| 9,331,515 | B2 | 5/2016 | Feuerstack et al. | |
| 10,263,430 | B2 * | 4/2019 | Narla | H02J 3/00 |
| 10,389,166 | B1 | 8/2019 | Sahoo et al. | |
| 11,128,251 | B1 | 9/2021 | Solodovnik et al. | |
| 11,368,100 | B2 * | 6/2022 | Danforth, III | H02J 7/02 |
| 11,831,156 | B1 | 11/2023 | Lin | |
| 11,831,157 | B1 | 11/2023 | Lin | |
| 12,532,398 | B2 * | 1/2026 | Gebert | H02M 7/062 |
| 12,573,858 | B2 * | 3/2026 | Berning | H02J 7/575 |
| 2005/0018456 | A1 * | 1/2005 | Lin | H02M 1/36<br>363/71 |
| 2016/0233790 | A1 * | 8/2016 | Izadian | H02M 7/797 |
| 2018/0175627 | A1 * | 6/2018 | Woodburn | B64D 33/00 |
| 2023/0019530 | A1 * | 1/2023 | Slepchenkov | H02J 3/32 |
| 2023/0318346 | A1 * | 10/2023 | Fasching | H02J 7/82 |
| 2024/0178689 | A1 | 5/2024 | Swamy | |

FOREIGN PATENT DOCUMENTS

| | | | | |
|---|---|---|---|---|
| EP | 4607746 | A1 | 8/2025 | |
| JP | 202239705 | A | 3/2022 | |
| WO | WO-2024040342 | A1 * | 2/2024 | H02P 5/74 |
| WO | 2025176524 | A1 | 8/2025 | |
| WO | 2025180746 | A1 | 9/2025 | |
| WO | 2025180810 | A1 | 9/2025 | |

OTHER PUBLICATIONS

Luo et al., "A New Virtual Oscillator Control without Third-Harmonics Injection for DC/AC Inverter", IEEE Transactions Power Electronics, 2021, p. 1-10.

* cited by examiner

METHODS AND SYSTEMS FOR MULTI-PHASE AC GENERATION USING INVERTER

CROSS-REFERENCE TO RELATED APPLICATIONS

This application is a bypass continuation of International Patent Application No. PCT/EP2025/058395 filed Mar. 27, 2025, and claims priority to European Patent Application No. 24183567.7 filed Jun. 20, 2024, the disclosures of which are hereby incorporated by reference in their entireties.

BACKGROUND

Field

The present teachings relate to off-grid power supply units. More specifically, the present teachings relate to electrical units such as inverters usable for multi-phase AC power delivery. The present teachings also relate to associated methods and software products.

Description of Related Art

Multi-phase power is commonly used for powering large electrical machines and equipment. As compared to a single-phase AC circuit and devices commonly used in most households, multi-phase systems find wider application in industrial equipment. Multi-phase systems may also be referred to as polyphase systems. A multi-phase power delivery involves power transmission via multiple conductors, where the voltage of each live conductor is phase shifted relative to other live conductors. The phase shift is usually predetermined. For example, for a three-phase system, the voltage of each conductor is phase shifted by 120° (120-degrees) relative to each of the other live conductors.

There exist certain applications where power is required on sites where availability of grid power cannot be relied upon. For example, power infrastructure may be absent and/or it may be unreliable. An example of such application is construction site where grid power is not available. Such sites may instead rely upon off-grid measures such as fuel-powered generators and battery-based power supplies. Battery-based AC power supplies usually involve an electrical inverter, which converts DC voltage of the battery to an AC voltage. Often times, a single-phase power supply suffices for day-to-day work, such as supplying power tools such as hand drills, saws, pumps, etc. There may sometimes arise need for a multi-phase power, for example, a three-phase power for operating a heavy motor or machine. A portable single-phase supply may be lighter, and thus easier to carry around to various locations on the site. A multi-phase supply may however be heavier relative to a single-phase supply with similar power reserve per phase. Especially if the need of multi-phase power is sparse, the user may prefer to have single-phase supplies in stock.

SUMMARY

Thus, there exists a need of products and methods which can allow a user to establish multi-phase power when it is needed without having available a dedicated multi-phase system. At least some of these problems inherent to the existing art can be shown solved by the subject matter of the hereby accompanying independent claims. Additional inventive aspects are highlighted in the dependent claims and/or the rest of the disclosure.

When viewed from a first perspective, there can be provided a method for operating an electrical inverter in a discharge mode in which the electrical inverter is operable to deliver AC electrical power as a second AC power signal via an output port, which AC electrical power is derived from energy stored in an electrical energy storage, the method comprising:

- measure, via an input port, a first AC power signal;
- generate, via a first oscillator, a first tuned signal dependent upon the first AC power signal;
- determining, using the first tuned signal, a first phase value, wherein the first phase value is indicative of phase of the first AC power signal;
- generating the second AC power signal which is shifted by a pre-determined first phase-difference value from the first phase value.

Advantageously, the first AC power signal and second AC power signal are usable as multi-phase AC output for powering an electrical load.

It shall be appreciated that the first AC power signal and the second AC power signal are having voltage values at or around a pre-determined grid power. For example, the first AC power signal may be at or around a single-phase voltage of a pre-determined grid type. For example, the first AC power signal may be at a single-phase voltage of 230 V, and at a frequency of 50 Hz. The present teachings are not limited to any specific grid voltage or frequency. Accordingly, the proposed teachings can be applied to any grid voltage world-wide. As a non-limiting example, the first AC power signal may be at a single-phase voltage of 120 V, and at a frequency of 60 Hz. Similarly, the present teachings are not limited to any specific grid frequency or any specific combination of voltage and frequency. Accordingly, the present teachings can be applied to any kind of AC voltage or frequency used for operating an electrical load.

The first AC power signal may be measured by any suitable voltage sensor and/or current sensor. The voltage sensor and/or current sensor may be included at the input port or circuitry thereafter in the electrical inverter. It shall also be appreciated that the input port, the first oscillator, the means (e.g., any device and/or computer processor and/or software code) for determining the phase value, and the means for generating the second AC power signal may be included in the same unit, e.g., they may be part of the electrical inverter and/or part of the electrical unit which comprises the inverter.

It shall be appreciated that the present teachings can allow a multi-phase AC power using stand-alone and independent power sources. For example, the first AC power signal and the second AC power signal are provided from independent power sources which may or may not be of the same type.

In some non-limiting aspects, the first AC power signal is provided by a first power source. In some non-limiting aspects, first power source may be AC mains grid. Thus, the user is enabled to leverage the present teachings for producing multi-phase AC power for operating an electrical load even when just single-phase AC mains grid power is available. The electrical inverter is synchronized with the single-phase AC mains grid power to generate the second AC power signal which is shifted by the pre-determined first phase-difference value from the first phase value of the single-phase AC mains grid power.

In some non-limiting aspects, the first AC power signal and the second AC power signal are provided at and/or via a polyphase network such as a delta circuit (Δ-circuit) or a wye circuit (Y-circuit). For example, the first power source and the electrical inverter may be part of a polyphase network (e.g., forming a wye source), which sources power to a delta-connected load. In some non-limiting aspects, the load may also be wye-connected. In general, the polyphase network may comprise any three-wire or four-wire circuit on the power signal side, or on the load side.

In some non-limiting aspects, the first power source may a power generator, e.g., an engine generator such as a Genset. In such cases, the electrical inverter operates in a synchronized manner to the power generator such that the use can power a multi-phase electrical load using the first AC power signal from the generator, and the second AC power signal from the electrical inverter.

In some non-limiting aspects, the first power source is another electrical inverter. The another electrical inverter may or may not have similar functionality as the electrical inverter which is herein disclosed. Thus, the electrical inverter can work in tandem to the another electrical inverter to produce multi-phase AC power. As desirable for a multi-phase AC output of which the first AC power signal and the second AC power signal are parts of, the first AC power signal and the second AC power signal may have similar amplitude and frequency. According to a non-limiting aspect, the electrical inverter is operable to control the frequency and/or amplitude of the second AC power signal in response to the first AC power signal (e.g., the measurement of the first AC power signal). For example, the electrical inverter may adapt the amplitude and/or frequency of the second AC power signal according to the first AC power signal.

In some non-limiting aspects, the another electrical inverter with functionality as proposed in this disclosure (e.g., similar to the electrical inverter) is connected downstream of the electrical inverter. In such cases, e.g., multi-phase AC power with more than two phases can be provided. For example, the first AC power signal (provided by any kind of first power source), the second AC power signal (provided by the electrical inverter) and a third AC power signal (provided by the another electrical inverter) can constitute a three-phase AC power which is usable for supplying a three-phase electrical load. In some non-limiting aspects, the first AC power signal, the second AC power signal and output of the another electrical inverter are provided at and/or via a polyphase network such as a delta circuit or a wye circuit. For example, the first power source, the electrical inverter, and the another electrical inverter may be part of a polyphase network (e.g., forming a wye source), which sources power to a delta-connected load. In some non-limiting aspects, the load may also be wye-connected. In general, the polyphase network may comprise any three-wire or four-wire circuit on the power signal side, or on the load side.

In some non-limiting aspects, for an n-phase AC power, at least (n−1) electrical power phases are individually provided by an electrical inverter pursuant to the present teachings. It shall be appreciated that the n-phases may shifted by pre-determined phase difference value relative to each other, which phase difference value may be the same, or it may be different between one AC power signal to another. In some non-limiting aspects, all AC power signals (all phases of the multi-phase AC output) are individually provided by an electrical inverter pursuant to the present teachings. For example, for a 3-phase power, at least 2 phases are generated by two standalone electrical inverters pursuant to the present teachings. In some non-limiting aspects, all phases of a three-phase power are provided via individual electrical inverters pursuant to the present teachings. As a non-limiting example, the second AC power signal may be offset by a phase difference value of 120-degrees, or thereabouts, relative to the first AC power signal. Dependent upon specific requirements of the multi-phase AC power needed, the pre-determined phase difference value may be any value. Those with ordinary skill in the art shall appreciate that for a three-phase system, each of the three phases is offset by a phase difference value of 120-degrees with respect to the others. In the present disclosure, phase values have generally been specified in degrees (e.g., 120°, or 120-degrees) on a scale between 0° and 360°, however those with ordinary skills in the art shall appreciate that it is just one of the ways to specify phase value or phase shift. For example, phase values may not only be expressed in degrees (e.g., from 0° to 360°, or from −180° to +180°), but they may also be defined in radians, e.g., by using "2π" in place of "360°". Similarly, the phase values may even be specified between −π and +π. Variations such as a specific notation, span or scale is thus non-limiting to the scope or generality of the present teachings.

It shall be appreciated that even when a user has their disposal only single-phase power units (e.g., electrical inverters), the present teachings can allow generating multi-phase AC power using those single-phase units. The user can then be able to power multi-phase loads using single-phase supplies. This can increase flexibility for the end-user in using the power units in different situations and needs, without acquiring a dedicated multi-phase power supply. Alternatively, or in addition, this can also have production advantages. For example, the present teachings can simplify manufacture of multi-phase inverter systems by leveraging supply chain and components used in single-phase systems. This can bring other advantages such as making the systems more economical, making it easier to repair (e.g., by replacing a defective phase), reducing inventories, and making the system or their production easier to scale.

By generating the first tuned signal which is dependent upon the first AC power signal, it can be determined the first phase value, which is indicative of the first AC power signal. In some non-limiting aspects, the first oscillator is at least partially a voltage controlled oscillator ("VCO"). Alternatively, or in addition, in some non-limiting aspects, the first tuned signal is in the form of a sawtooth signal (e.g., sawtooth function). Alternatively, or in addition, in some non-limiting aspects, the first oscillator is implemented at least partially with digital logic. For example, the first oscillator may at least partially be a digital oscillator such as a numerically controlled oscillator ("NCO"). In some non-limiting aspects, the first tuned signal is digitally generated sawtooth signal, for example, generated by a cyclic digital counter. For example, by aligning phase of the sawtooth signal with the phase of the first AC power signal (e.g., a sine function), the first phase value can be determined. This can be used to generate the second AC power signal which has a desired relationship with the first AC power signal, e.g., the second AC power signal may be phase shifted by a pre-determined first phase-difference value relative to the first AC power signal.

In some non-limiting aspects, determining of the first phase value may involve:

- generating a first phase lock signal indicative of a first synchronized state between the first tuned signal and the first AC power signal (e.g., waveform of the first AC power signal);
- providing, via a second oscillator, a second tuned signal;

phase locking the second tuned signal to the first tuned signal when the first phase lock signal is active, using the second tuned signal to generate the second AC power signal.

Accordingly, the first phase lock signal may be generated when the first tuned signal (e.g., in form of digital sawtooth wave) is phase aligned relative to the first AC power signal. In response to the first phase lock signal, via a second oscillator, a second tuned signal may be phase aligned relative to the first tuned signal. An advantage of doing so can be that the pre-determined first phase-difference value can be provided at or around the second tuned signal to obtain the second AC power signal in a desired first phase-difference value relative to the first AC power signal. Another advantage can be that phase locking to the second signal is conditioned upon the first phase lock signal being active, which prevents an out of phase second AC power signal from being generated. Thus, this can allow better quality of the multiphase power signals, potentially preventing undesired consequences to connected load equipment.

In some non-limiting aspects, the second oscillator is similar to the first oscillator. The aspects as discussed for the first oscillator can also apply for the second oscillator. Thus, the second oscillator may at least partially a voltage-controlled oscillator ("VCO"). Alternatively, or in addition, in some non-limiting aspects, the second tuned signal may be in the form of a sawtooth signal (e.g., sawtooth function). Alternatively, or in addition, in some non-limiting aspects, the second oscillator may be implemented at least partially with digital logic. For example, the second oscillator may at least partially be a digital oscillator such as a numerically controlled oscillator ("NCO"). In some non-limiting aspects, the second tuned signal may be digitally generated sawtooth signal, for example, generated by a cyclic digital counter. For example, by aligning phase of the second tuned signal with the phase of the first tuned signal (e.g., both sawtooth functions), the first phase value can be determined. This can be used to generate the second AC power signal which has a desired relationship with the first AC power signal, e.g., the second AC power signal may be phase shifted by a pre-determined first phase-difference value relative to the first AC power signal.

Alternatively, or in addition, in a further aspect, the first oscillator and the second oscillator are NCOs with similar ranges. For example, each oscillator may have an increment value which is added to a digital accumulator at a predetermined clock signal tick. In some non-limiting aspects, the NCO has 2048 steps in each cycle. For example, the accumulator may start at value 0 and incremented by 1 at each predetermined clock signal tick until the accumulator reaches 2047, at which point the accumulator may be reset to 0. Thus, the accumulator may be cyclically reset after a predetermined increment value (e.g., 2047 steps) to produce a sawtooth signal (e.g., the first tuned signal and/or the second tuned signal) via the respective oscillator. For example, during operation, the accumulator state may resemble the following sequence: 0, 1, 2, 3, . . . 2046, 2047, 0, 1, 2, . . . and so forth. Those with normal skills in the art shall appreciate that the present teachings are not limited to a specific number of steps and/or the increment size. For example, the accumulator may be incremented by any other non-zero value than 1, such as an increment value of 5. Similarly, the number of steps may be higher or lower than 2048.

Thus, in some non-limiting aspects, the first tuned signal and the second tuned signal are digital sawtooth signals spanning between a pre-determined minimum value and a pre-determined maximum value. As mentioned in the above non-limiting example, the pre-determined minimum value may be 0, and the pre-determined maximum value may be 2047.

In some non-limiting aspects, at least one of the oscillators (e.g., the first oscillator and/or the second oscillator) is controlled via a control loop which adjusts the frequency of that oscillator as a control variable for adjusting the phase of the oscillator. In some non-limiting aspects, the control loop comprises a proportional-integral ("PI") control function (e.g., a PI controller). For example, the first oscillator may be controlled via first control loop which comprises a PI controller which adjusts the frequency of the first oscillator. Alternatively, or in addition, the second oscillator may be controlled via a second control loop which comprises a PI controller which adjusts the frequency of the second oscillator.

Alternatively, or in addition, in some non-limiting aspects, the first control loop or the first oscillator comprise a first phase detector. In some non-limiting aspects, the first phase detector performs a first transform operation on the measured first AC power signal and the first tuned signal. The first transform operation may be a direct-quardrature-zero ("DQZ") operation, a Park transformation operation or their likes. A Park transformation operation is also known as "αβ-dq" transformation. Thus, in some non-limiting aspects, the first oscillator may be part of a digital logic, e.g., a digital phase locked loop logic involving phase detection based on a Park transformation logic.

In some non-limiting aspects, the first transform operation involves at least one orthogonal component generation. For example, orthogonal component generation may involve determining sine and cosine components of the first tuned signal. Orthogonal component generation may also involve determining orthogonal components (e.g., sine and cosine components) of the first AC power signal. In some non-limiting aspects, the determination of sine and cosine components of the first tuned signal is performed using a first lookup table ("LUT"). The first LUT may comprise values which map values of the first tuned signal to values of a pre-determined sine function and/or cosine function. The first LUT may thus translate the first tuned signal to a first sine wave and/or a first cosine wave (or first orthogonal signals).

Thus, in some non-limiting aspects, determining of the first phase value may involve:

using the first tuned signal to pick values from a first lookup table ("LUT") to generate first orthogonal signals;

performing a first transform operation (e.g., a Park transformation operation) using the first orthogonal signals to obtain the first phase value.

The first transform can provide a dq frame which comprises a d-component (direct) and a q-component (quadrature), via which first phase value and/or the first synchronized state can be determined.

In some non-limiting aspects, the first phase-difference value may be established via the second oscillator.

In some non-limiting aspects, the generating the second AC power signal may further comprise:

using the second tuned signal to pick values from a second lookup table ("LUT") to generate a second AC waveform;

generating the second AC power signal dependent upon the second AC waveform.

The second LUT may comprise values which map values of the second tuned signal to values of a pre-determined sine function and/or cosine function. The first LUT may thus translate the second tuned signal to a second sine signal and/or a second cosine signal. For example, the second AC power signal may thus be generated using the second sine signal and/or the second cosine signal.

In some non-limiting aspects, the second oscillator is controlled via a second PI controller for adjusting (e.g., frequency locking) the second tuned signal in such a way that the second AC power signal stays offset with the first phase-difference value with respect to the first AC power signal. Alternatively, or in addition, in some non-limiting aspects, the second control loop or the second oscillator comprise a second phase detector. In some non-limiting aspects, the second phase detector performs phase detection operation by a subtraction operation between the first tuned signal and the second tuned signal. Especially in cases when the first tuned signal and the second tuned signal have similar properties (e.g., range or span), a difference between these two signals can be used to detect whether the signals are in phase or not. An advantage of doing so can be that the second phase detector can be made simpler, thus saving costs and/or processing power. The second controller can be used to adjust the frequency of the second oscillator such that the phase difference between the first tuned signal and the second tuned signal is either minimized or it remains at or close to a predetermined value (e.g., the first phase-difference value). Thus, the second AC power signal can be generated while locking it with a first phase-difference value relative to the first AC power signal.

In some non-limiting aspects, when the first phase lock signal is absent, the second oscillator may be in free-running mode, e.g., at a fixed frequency reference value (e.g., at or around grid frequency, e.g., 50 Hz, or 60 Hz) such that when the electrical inverter is used in stand-alone mode, it generates single phase power without need for synchronizing to any signal. The present teachings thus can allow an automated way to detect the presence of the first AC power signal, which leads to activation of the first control loop, in response to which (e.g., first phase lock signal) the second control loop is automatically activated to sync the electrical inverter output (e.g., the second AC power signal) to the first AC power signal.

In some non-limiting aspects, the electrical energy storage comprises at least one energy storage cell on which electrical energy can be stored (e.g., by charging the energy storage cell). Without limitation, the energy storage cell may be of any kind, e.g., a rechargeable battery cell (e.g., lithium-ion battery), supercapacitor, or their likes. In some non-limiting aspects, the electrical energy storage may even comprise energy storage cells of different kinds. In some non-limiting aspects, the electrical energy storage may be modular in nature. For example, electrical energy storage may comprise one or more energy modules of same or different kinds. Each energy module may comprise at least one energy storage cell. In some non-limiting aspects, at least one energy module comprises one or more energy storage cell of different kind as compared to the energy storage cells in other energy modules in the electrical inverter. In some non-limiting aspects, the electrical inverter is in the form of a multilevel inverter (e.g., a cascaded multilevel inverter).

In some non-limiting aspects, the electrical inverter is also operable in a charge mode. In charge mode the electrical inverter is operable to receive electrical power, e.g., present at an input port, for charging at least some of the energy storage cells of the electrical energy storage. It shall be appreciated that during the discharge mode the energy stored in the energy storage cells is used to provide inverter output (e.g., the second AC power signal).

In some non-limiting aspects, the electrical inverter includes at least one active bridge, for example, a plurality of switches arranged in an H-bridge arrangement. In other words, the electrical inverter may comprise at least one H-bridge circuit. The H-bridge may be a half-bridge, or it may be a full H-bridge. In some non-limiting aspects, at least some of the energy modules comprise an active bridge (e.g., an H-bridge circuit). For example, in some non-limiting aspects, the electrical inverter comprises a plurality of energy modules, and each energy module comprises an inverter circuit (e.g., an H-bridge circuit) and at least one rechargeable electrical energy storage cell. The switches may be any suitable switches, for example, transistors such as FETs, MOSFETs, IGBTs, or their combinations. In some non-limiting aspects, the electrical inverter is in the form of a cascaded H-bridge multilevel inverter.

In some non-limiting aspects, the first power source may be communicatively connected to the electrical inverter via a communications channel. In some non-limiting aspects, the communications channel may at least partially be wired digital type (e.g., USB, ethernet, or any other wired protocol of standard or non-standard type). Alternatively, or in addition, in some non-limiting aspects, the communications channel may at least partially be wireless (e.g., Bluetooth®, WiFi, mobile data, their likes or their combinations). In some non-limiting aspects, the communications channel may comprise power line communication ("PLC") between the first power source and the electrical inverter. In such case, e.g., the electrical inverter and first power source may communicate at least partially over the same wired connection via which the first AC power signal is provided at the input port of the electrical inverter.

According to another perspective, there can also be provided a system (e.g., an electrical inverter) comprising means for performing any of the herein disclosed methods (e.g., the steps of any of the herein disclosed methods).

For example, there can be provided an electrical inverter comprising:

an input port operable, in a charge mode, to receive electrical power for charging an electrical energy storage; and an output port operable, in a discharge mode, to deliver AC electrical power as a second AC power signal, the AC electrical power being sourced from the electrical energy storage;

wherein the electrical inverter is further operable in the discharge mode to:

measure a first AC power signal provided at the input port;

generate, via a first oscillator, a first tuned signal dependent upon the first AC power signal;

determining a first phase value, wherein the first phase value is indicative of phase of the first AC power signal;

generating the second AC power signal which is shifted by a pre-determined first phase-difference value from the first phase value.

When viewed from another perspective, there can also be provided an arrangement for multiphase AC power generation comprising at least two electrical inverter units as herein disclosed.

When viewed from yet another perspective, there can also be provided a kit comprising at least two electrical inverter units as herein disclosed. In some non-limiting aspects, the kit may further comprise a network unit (e.g., a polyphase network unit) and/or an automatic transfer switch ("ATS"). In some non-limiting aspects, the network unit and the ATS may be included in the same device. In some non-limiting embodiments or aspects, the ATS may be the same as or similar to or include at least some components that are the same as or similar to the electrical device (e.g., portable electrical device) described in at least one of: Greek application No. 20240100139, European application No. 24020099.8, European application No. 24020100.4, PCT application No. PCT/EP2025/052147 and/or PCT application. No. PCT/EP2025/053246, the disclosures of each of which are hereby incorporated by reference in their entireties.

According to another perspective, there can also be provided a software product comprising computer-readable instructions which when executed by one or more suitable processing units cause any of the processing units to perform any of the herein disclosed methods (e.g., the steps of any of the herein disclosed methods).

Alternatively, or in addition to the aforementioned, when viewed from another perspective there can also be provided method of multiphase AC output generation, comprising:

- providing, via a first power source, a first AC power signal;
- providing, via a second power source, a second AC power signal; and
- combining the first AC power signal and the second AC power signal to obtain the multiphase AC power output,
- wherein the second power source is operable to provide the second AC power signal with a second phase value which is shifted by a pre-determined first phase-difference value from a first phase value of the first AC power signal, and wherein at least the second AC power signal is off-grid type.

The method may further comprise:

- providing, via a third power source, a third AC power signal; and
- obtaining the multiphase AC power output by combining the first AC power signal, the second AC power signal and the third AC power signal, wherein
- the third power source is operable to provide the third AC power signal with a third phase value which is shifted by a pre-determined amount from the first phase value and/or the second phase value, and wherein the third AC power signal is off-grid type.

Thus, there can also be provided, method of multiphase AC output generation, comprising:

- providing, via a first power source, a first AC power signal;
- providing, via a second power source, a second AC power signal;
- providing, via a third power source, a third AC power signal; and
- combining the first AC power signal, the second AC power signal and the third AC power signal to obtain the multiphase AC power output (e.g., three-phase power output),
- wherein the second power source is operable to provide the second AC power signal with a second phase value which is shifted by a pre-determined first phase-difference value from a first phase value of the first AC power signal, and wherein the third power source is operable to provide the third AC power signal with a third phase value which is shifted by a pre-determined amount from the first phase value and/or the second phase value, and wherein at least the second AC power signal and the third AC power signal are off-grid type.

As it was discussed previously, in some non-limiting aspects, each of the power sources are preferably self-contained or independent of the other power sources. For example, first power source, the second power source, and the third power source are stand-alone or independent of each other. For example, each of the power sources may be a single-phase power source. Thus, at least one of the power sources is operable to provide its AC power signal independent of (e.g., without) other of the power sources. It shall be appreciated that at least the second power source may be electrical inverter as herein disclosed. Alternatively, or in addition, the third power source may be electrical inverter as herein disclosed. For example, the second power source may be electrical inverter, and the third power source may be another electrical inverter as herein disclosed. In some non-limiting aspects, the first power source, the second power source, and the third power source are instances of the electrical inverter as herein disclosed.

In some non-limiting aspects, the first power source is AC mains grid power. In some non-limiting aspects, the first power source is fuel-based power generator.

BRIEF DESCRIPTION OF THE DRAWINGS

The present solution is described with reference to the attached figures. The figures are not drawn to scale and they are provided merely to illustrate the instant solution. Several aspects of the present solution are described below with reference to example applications for illustration. It should be understood that numerous specific details, relationships, and methods are set forth to provide a full understanding of the present solution. One having ordinary skill in the relevant art, however, will readily recognize that the present solution can be practiced without one or more of the specific details or with other methods. In other instances, well-known structures or operations are not shown in detail to avoid obscuring the present solution. The present solution is not limited by the illustrated ordering of acts or events, as some acts may occur in different orders and/or concurrently with other acts or events. Furthermore, not all illustrated acts or events are required to implement a methodology in accordance with the present solution.

It should also be appreciated that the terminology used herein is for the purpose of describing particular embodiments only and is not intended to be limiting of the present solution. As used herein, the singular forms “a”, “an” and “the” are intended to include the plural forms as well, unless the context clearly indicates otherwise. Furthermore, to the extent that the terms “including”, “includes”, “having”, “has”, “with”, or variants thereof are used in either the detailed description and/or the claims, such terms are intended to be inclusive in a manner similar to the term “comprising.”

Further, unless otherwise defined, all terms (including technical and scientific terms) used herein have the same meaning as commonly understood by one of ordinary skill in the art to which this solution belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As noted above, an electrical inverter may comprise energy modules and a processing unit (e.g., control unit or controller) for controlling operations thereof. The processing unit or control unit may be configured to selectively activate and deactivate the energy modules for causing the electrical inverter to deliver AC power to the load with the correct voltage, current and frequency. The present solution is directed to a novel technique for operatively coupling the electrical inverter to other AC power sources to obtain multi-phase AC electrical power. In some non-limiting embodiments, at least some of the energy modules comprise power switching elements, e.g., part of active bridge such as an H-bridge. The H-bridge may be a half H-bridge or full H-bridge.

Figure 1:
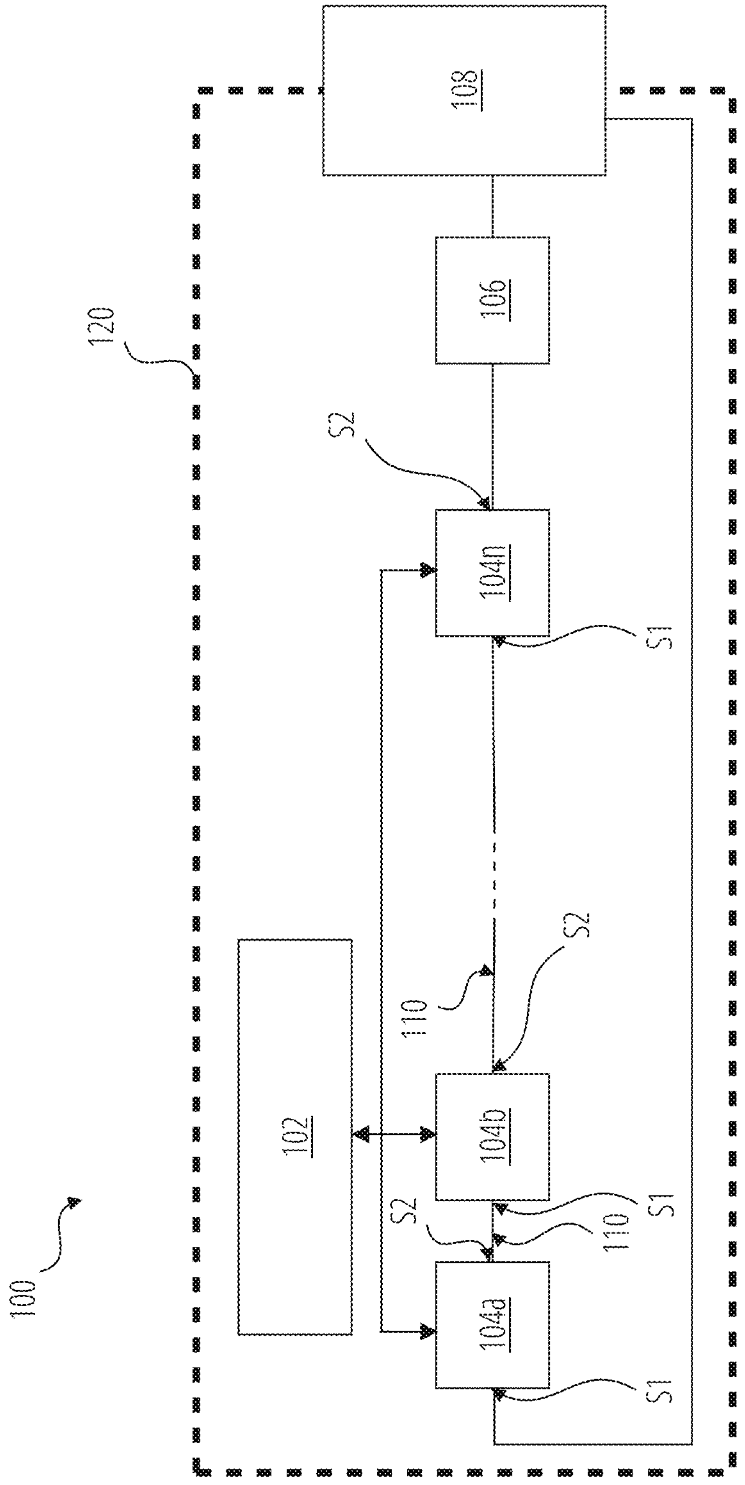

FIG. 1 shows an illustration of a modular inverter.

Figure 2:
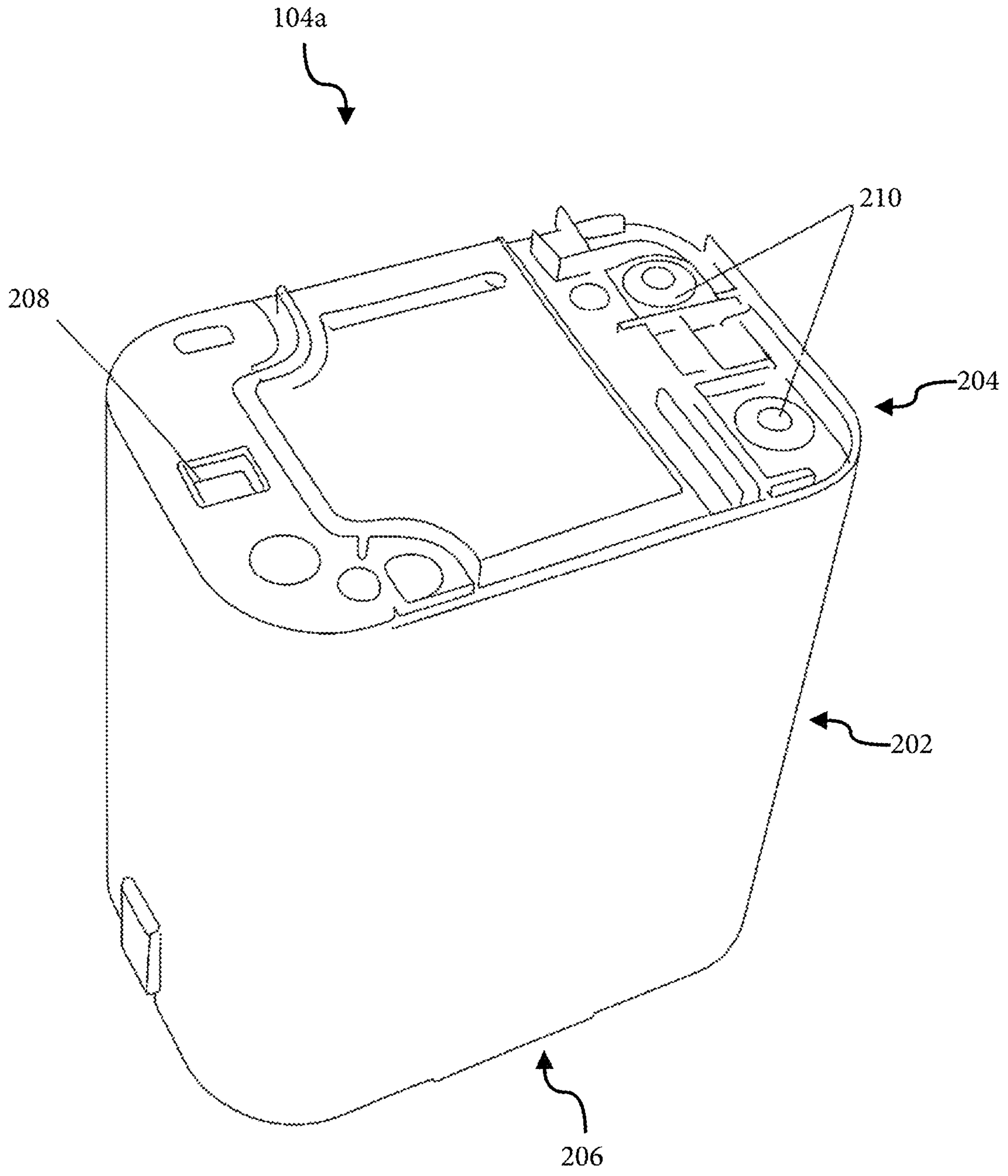

FIG. 2 shows an illustration of an energy module.

Figure 3:
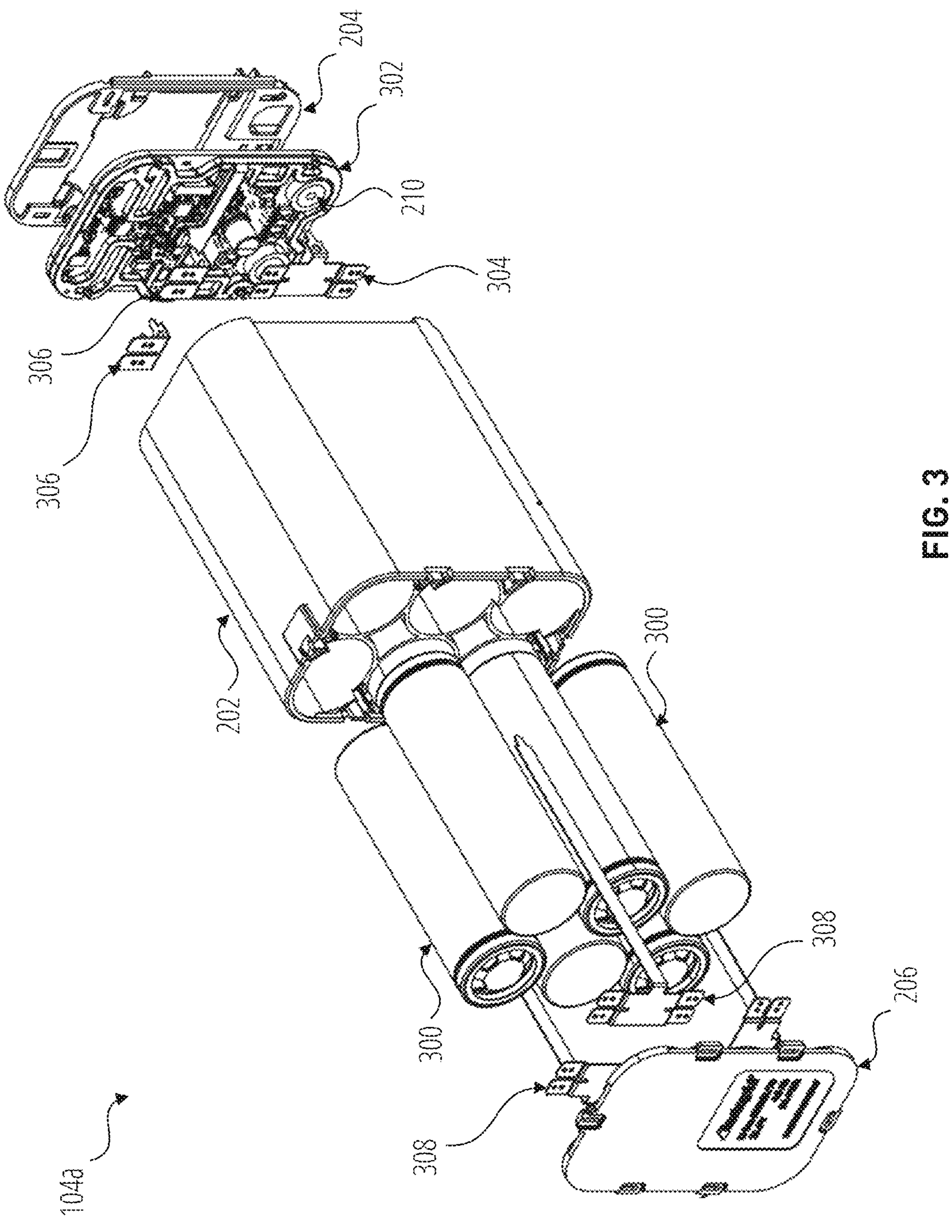

FIG. 3 shows another illustration of an energy module.

Figure 4:
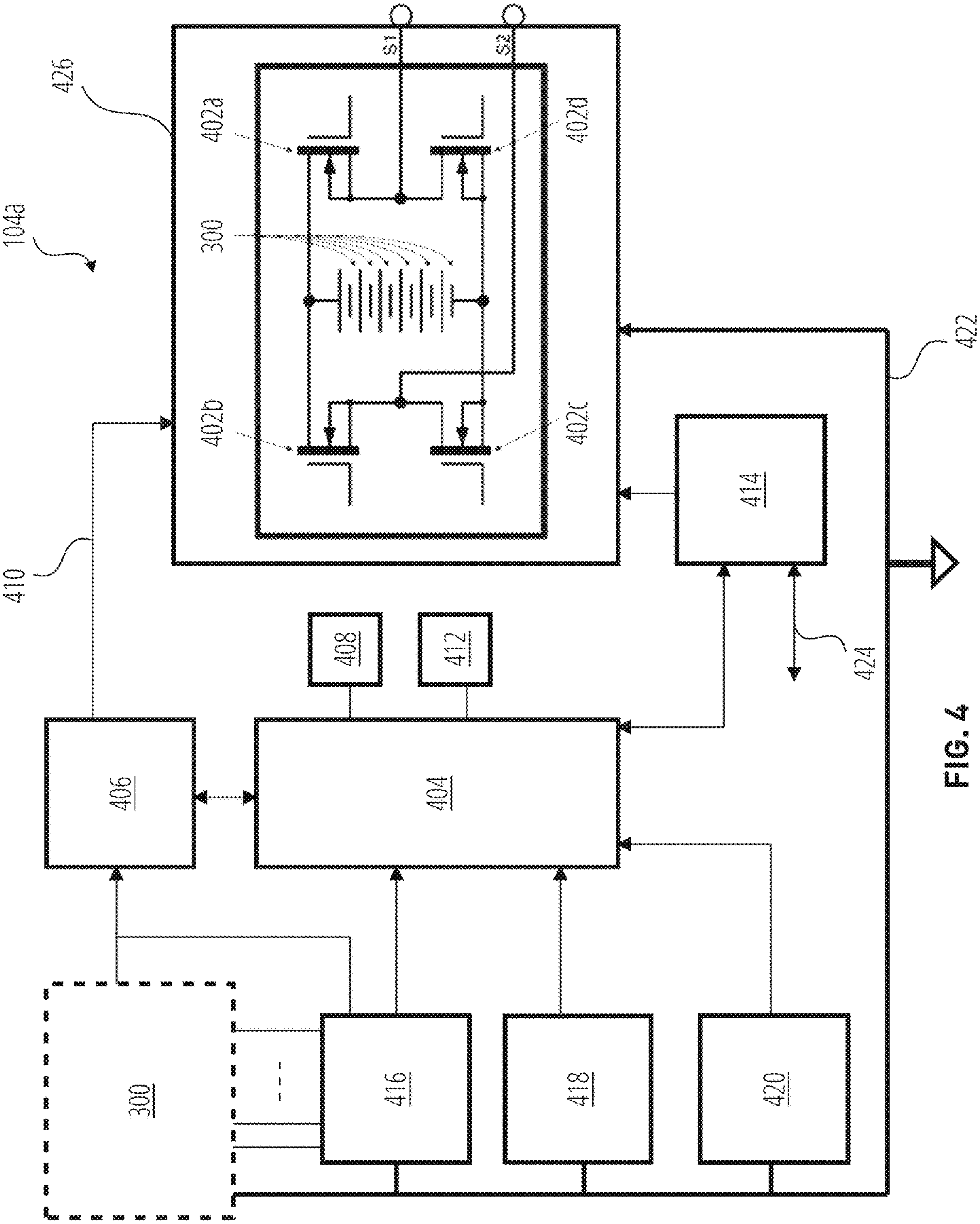

FIG. 4 illustrates a block diagram of an energy module.

Figure 5:
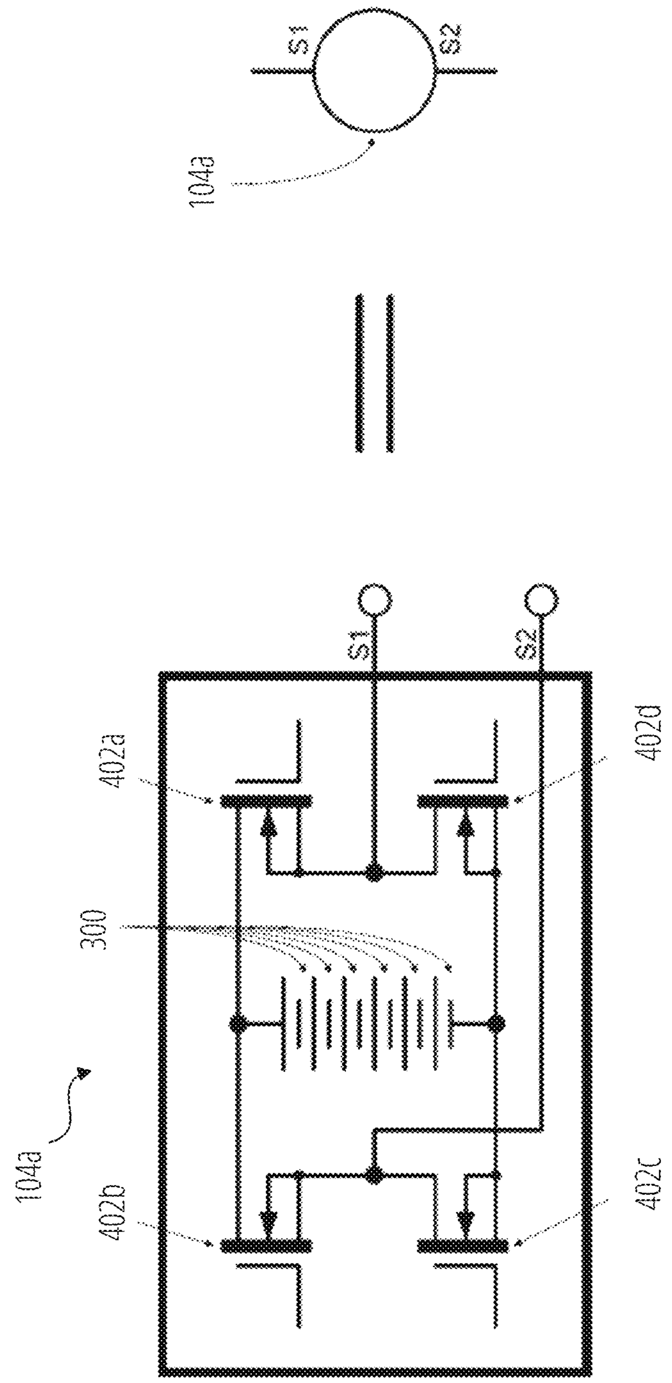

FIG. 5 illustrates a schematic diagram of an electrical inverter.

Figure 6:
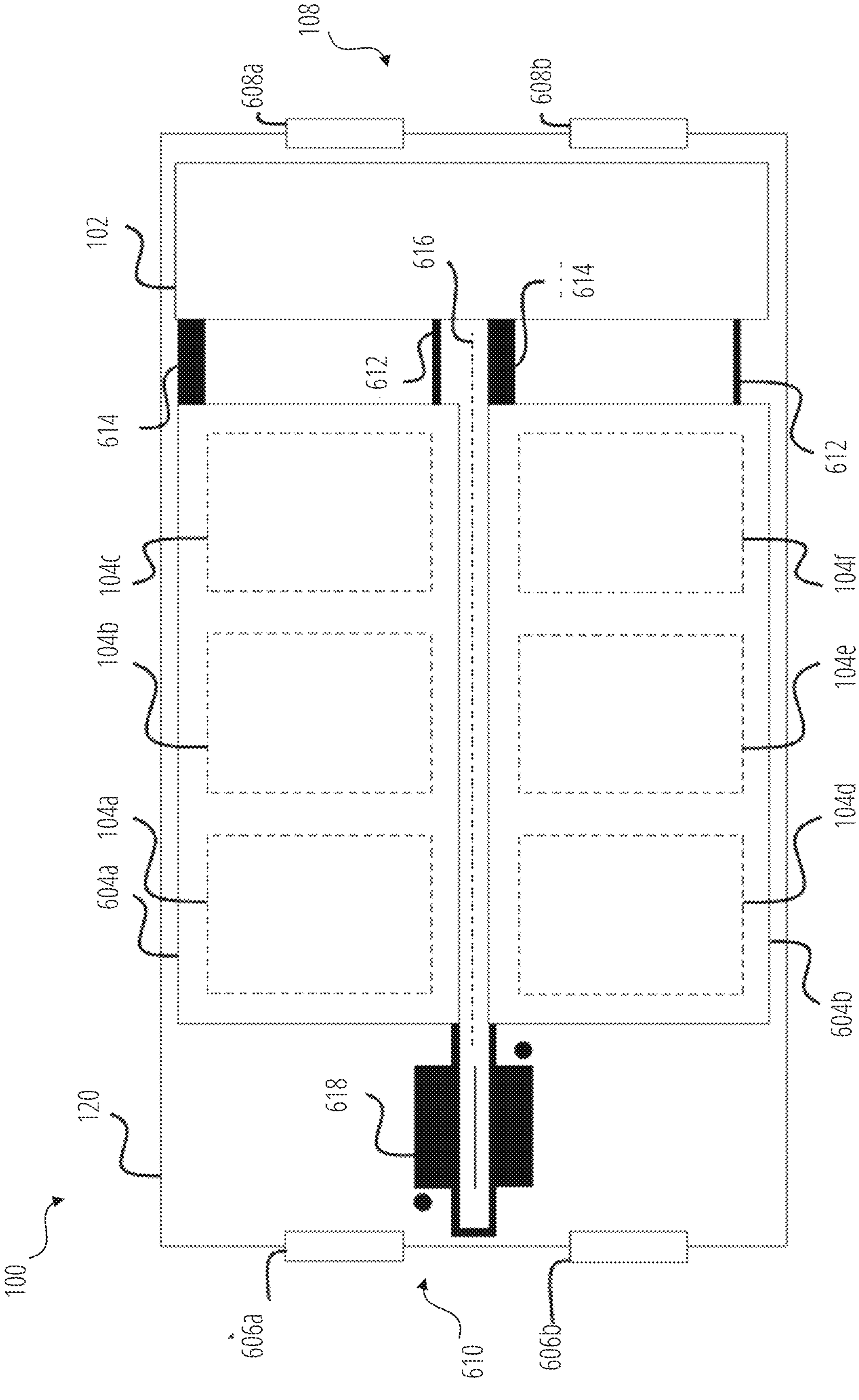

FIG. 6 illustrates another schematic diagram of an electrical inverter.

Figure 7:
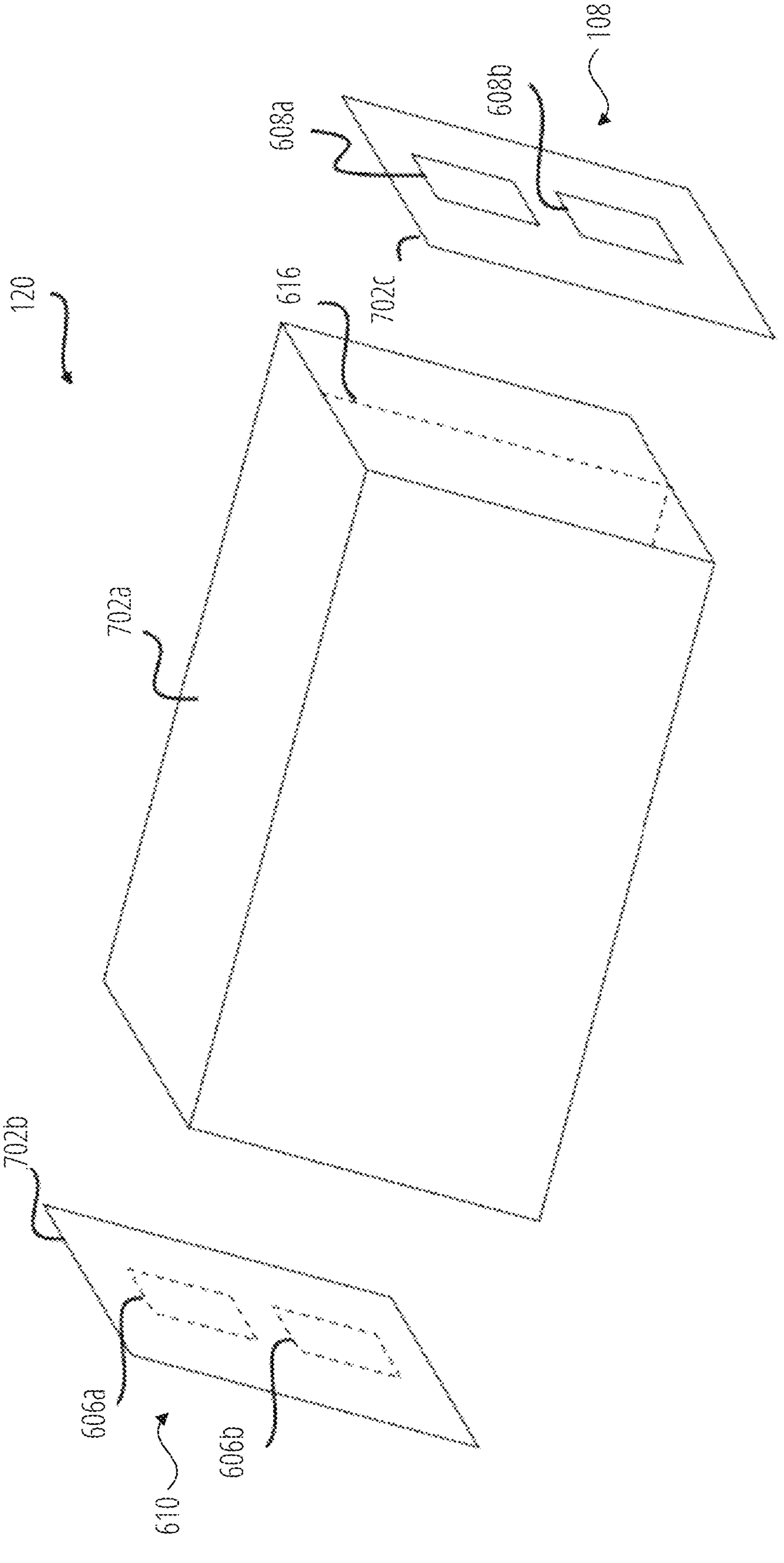

FIG. 7 illustrates another schematic diagram related to an electrical inverter.

Figure 8:
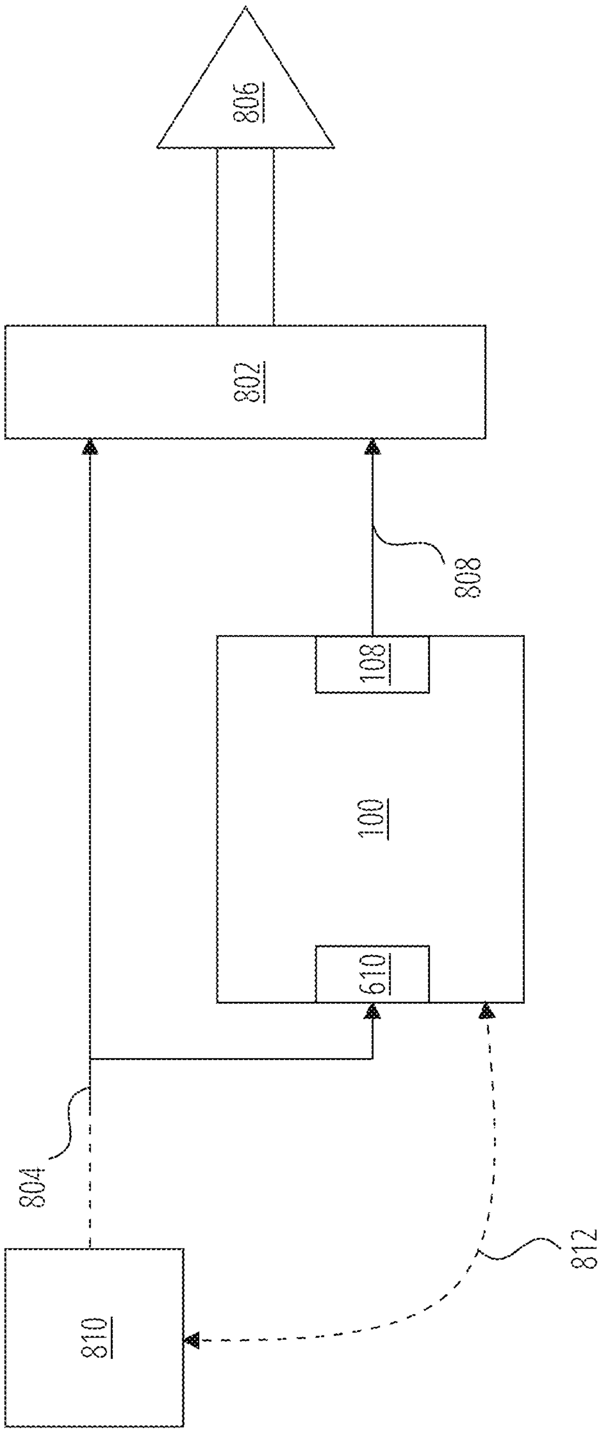

FIG. 8 illustrates a connection diagram according to an aspect of the present teachings.

Figure 9:
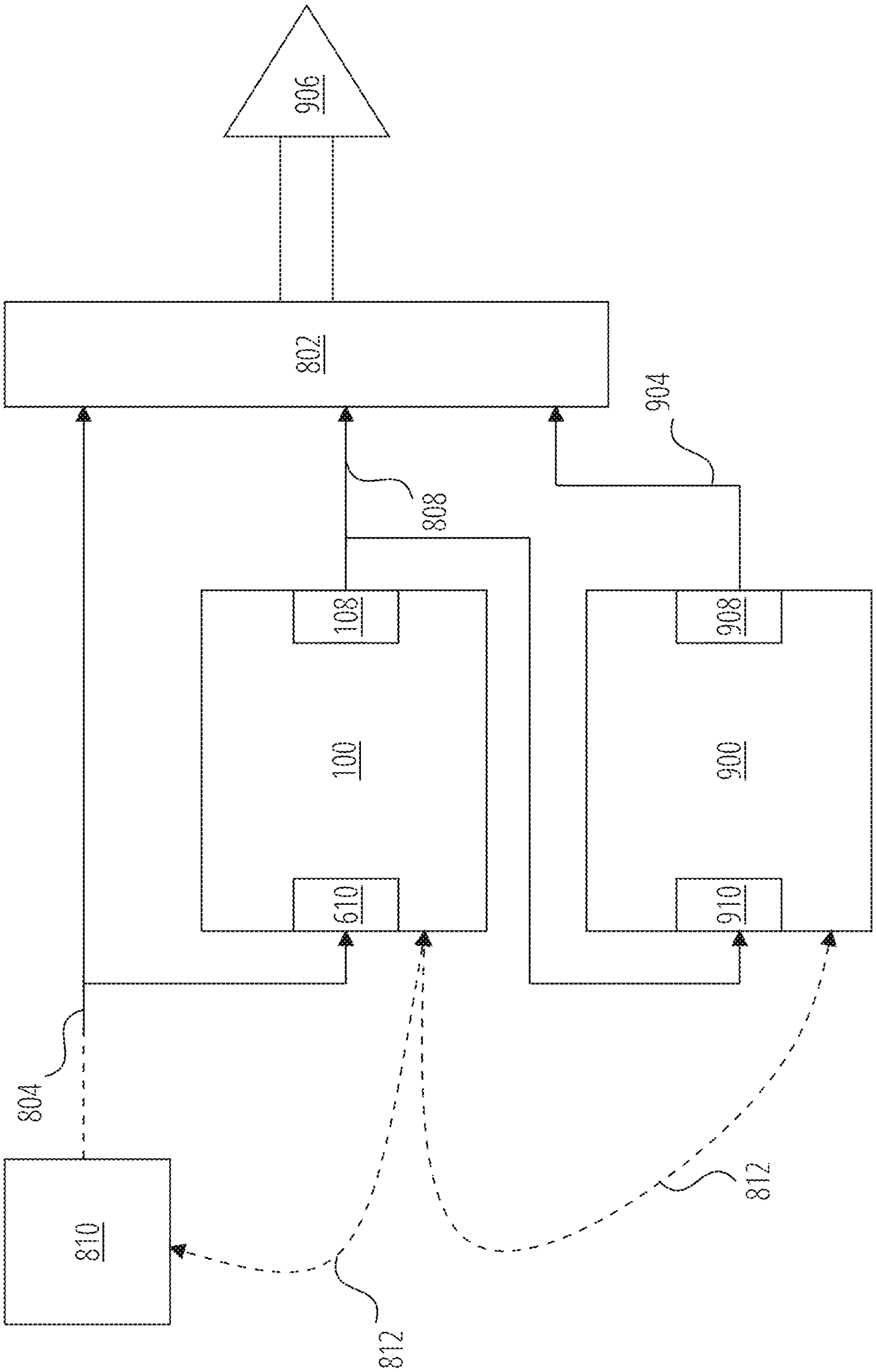

FIG. 9 illustrates another connection diagram according to an aspect of the present teachings.

Figure 10:
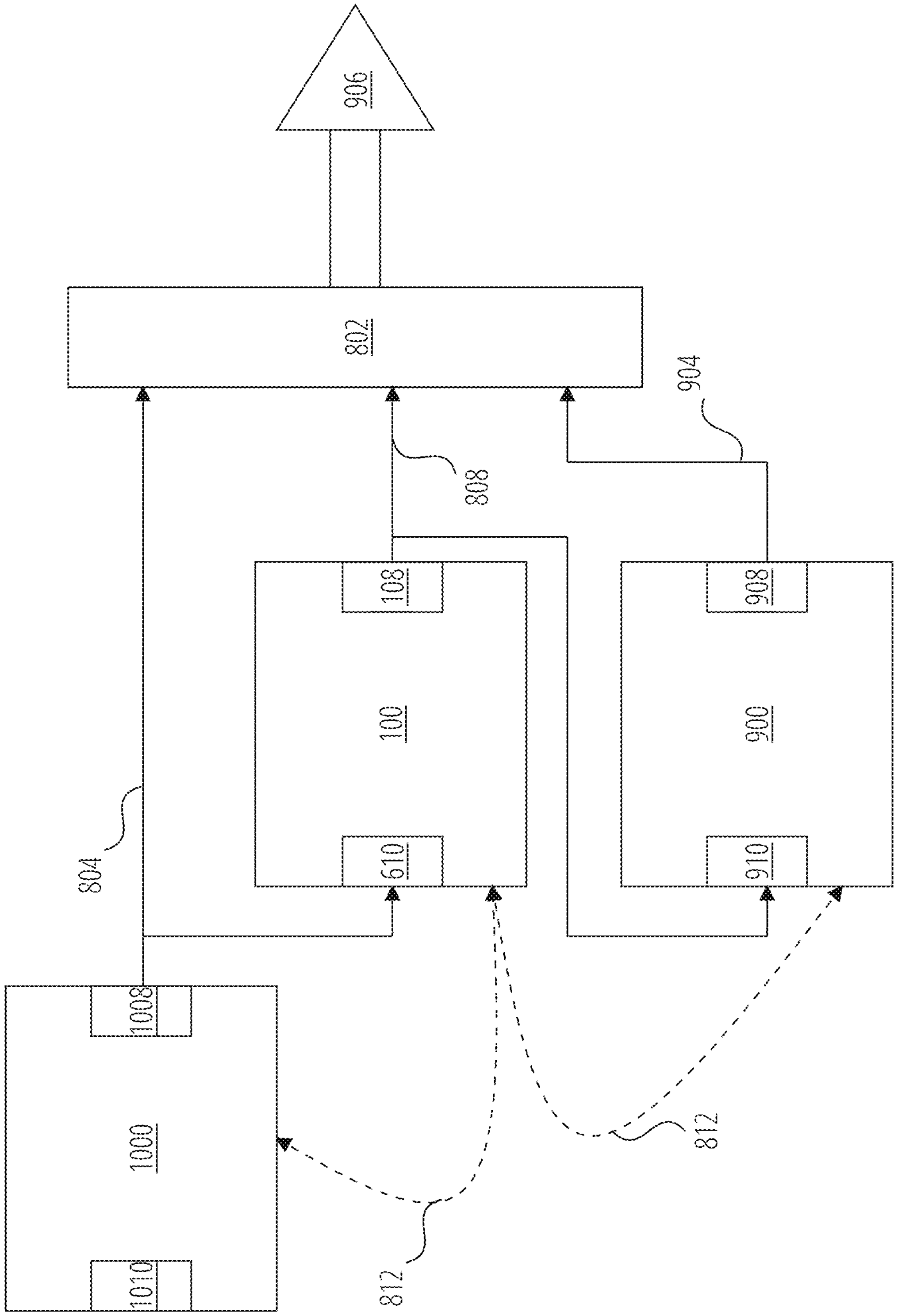

FIG. 10 illustrates yet another connection diagram according to an aspect of the present teachings.

Figure 11:
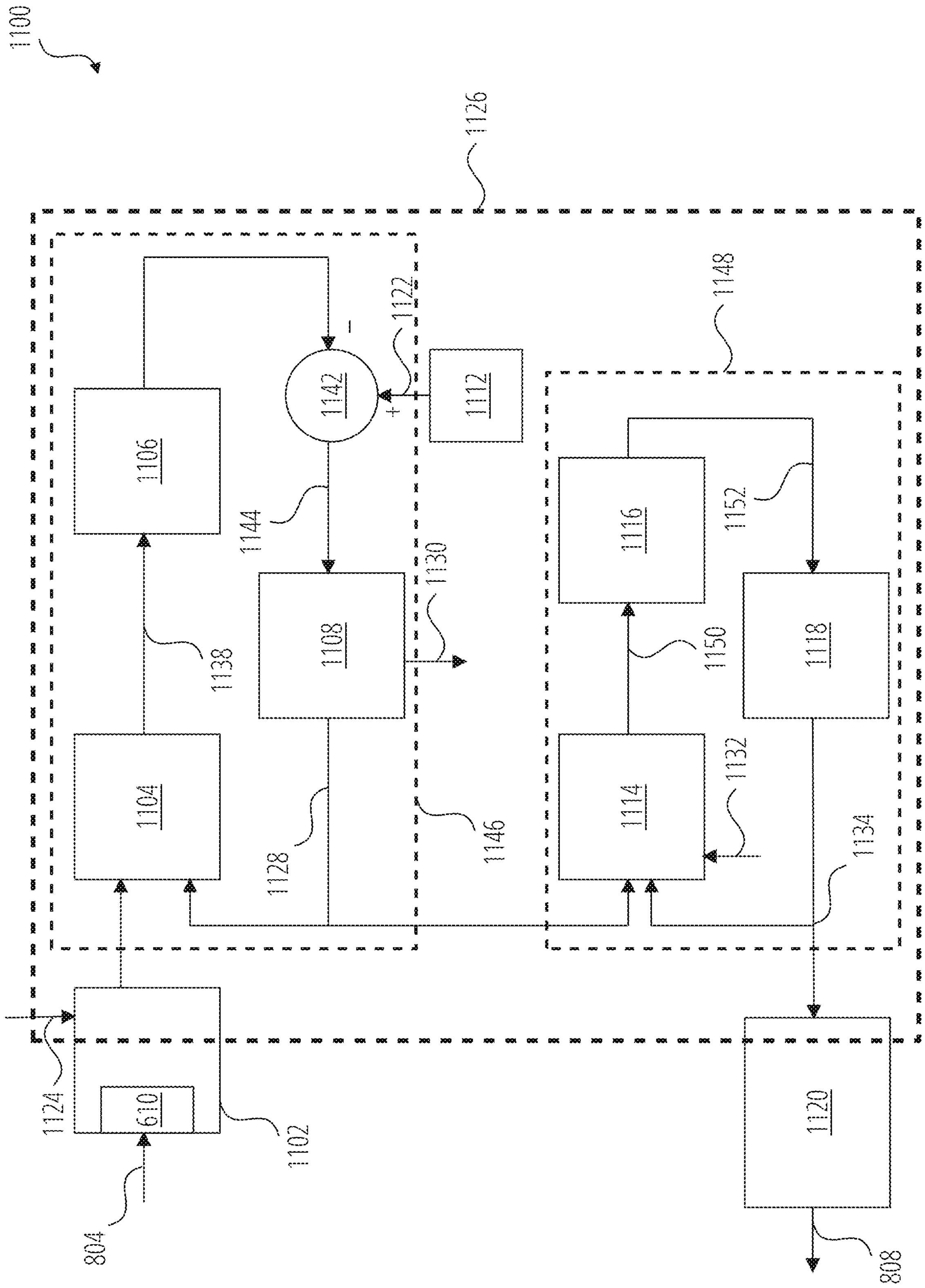

FIG. 11 illustrates a block diagram according to an aspect of the present teachings.

Figure 12:
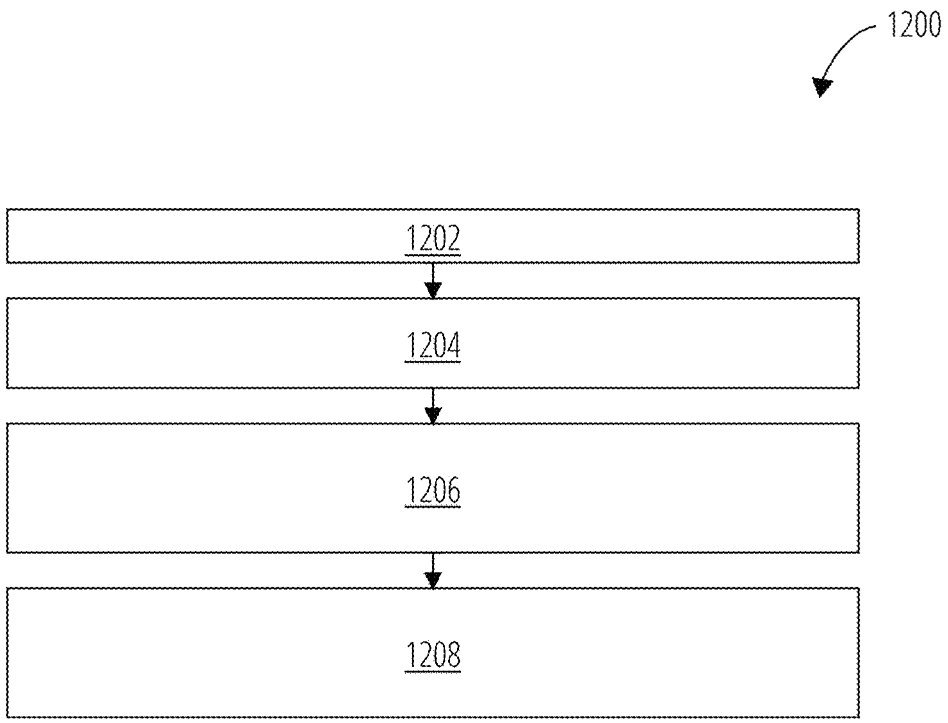

FIG. 12 illustrates a flowchart in accordance with an aspect of the present teachings.

DETAILED DESCRIPTION

FIG. 1 provides a non-limiting illustration of a modular electrical inverter 100. The electrical inverter 100 may even be referred to as a power supply (e.g., an AC power supply). The electrical inverter 100 may be portable or otherwise mobile. The electrical inverter 100 may have a size and weight to allow a single individual to carry the same with relative ease and/or to allow the same to be carried in a backpack or other bag. In some cases, electrical inverter 100 may be connected in series or parallel with other electrical inverters to form a power supply unit. For example, the electrical inverter 100 may be in the form of cascaded multilevel inverter (e.g., cascaded H-bridge multilevel inverter).

Electrical inverter 100 is generally operable to supply electric power to a load (not shown in FIG. 1). The load can include any electrical device that needs to be supplied power. Such loads can include, but are not limited to, another power supply, communication devices, media devices, golf carts, electric appliances, computing devices, power tools and/or professional or home energy storage systems.

As shown in FIG. 1, the electrical inverter 100 comprises a housing 120 in which electrical energy storage is provided in the form of a plurality of energy modules 104*a*, 104*b*, . . . , 104*n* (collectively referred to as "energy modules 104") are housed. Number "n" is an integer equal to or greater than one. Each of the energy modules 104 comprises one or more energy storage cells. Each of the energy modules 104 is generally configured to convert direct current ("DC") outputs from internal electrical energy storage cells into an alternating current ("AC") output of the energy module. The energy storage cells can include, but are not limited to, battery cells and/or super capacitors. The energy modules 104 are electrically connected to each other via wires 110 (e.g., insulated wires). In this way, the AC outputs S1, S2 of the energy modules 104 are combined or otherwise summed together to produce the AC output power of the electrical inverter 100. More specifically, the energy modules 104 are connected in series in a controllable manner to supply different voltages at the output of the electrical inverter 100. Output port 108 provides a means to connect the output of the electrical inverter 100 to the load. The output port 108 may comprise output terminals and/or electrical socket (e.g., standard or custom type) for connecting the electrical inverter 100 to the load. In some non-limiting embodiments or aspects, electrical inverter 100 and/or any (e.g., one, some, or all) of the energy modules 104 may be the same as or similar to or include at least some components that are the same as or similar to the electrical system and/or energy storage modules in at least one of: U.S. Provisional Ser. No. 63/556,996, filed Feb. 23, 2024, European Patent Application No. 24161854.5, filed Mar. 6, 2024, and/or PCT Application No. PCT/EP2025/053667, filed on Feb. 12, 2025, the disclosures of each of which are hereby incorporated by reference in their entireties.

In some uses, more than one instance of the electrical inverter 100 may be coupled together to obtain a larger capacity power supply and/or a multi-voltage power supply. Such plurality of instances of the electrical inverter 100 may, for example, be enclosed in a common housing (not shown in FIG. 1). In some non-limiting cases, it is further possible to obtain multi-phase power supplies using multiple instances of the electrical inverter 100. It shall be appreciated that such arrangements may further benefit from a reliable thermal monitoring of the energy storage cells which are packed together.

Operation of the energy modules 104 may be controlled by a control unit 102. Processing unit or control unit 102 may reside external to the electrical inverter 100 in some scenarios in which the electrical inverter 100 is a part of an inverter system. The inverter system can include a plurality of electrical inverters 100 that are connected to each other and controlled by a central controller. Control unit 102 is shown internal to the electrical inverter 100 in FIG. 1 for ease of illustration and explanation of the system operations. However, the present solution is not limited to the shown configuration.

Control unit 102 is configured to selectively activate and deactivate the energy modules 104 for causing the electrical inverter 100 to deliver AC power (e.g., a second AC power signal) to the load with the correct voltage, current and frequency. The control unit 102 is connected to each of the energy modules 104*a*, 104*b*, . . . , 104*n* so that the energy modules can be controlled individually thereby. The control unit 102 is configured to selectively transition each energy module between a battery mode and a bypass mode. When an energy module is in its battery mode, the internal electrical energy storage cells are switched into the circuit such that they are connected between terminals S1, S2 thereof. As such, a voltage output from the energy storage cells is provided at terminal S1 and S2. In contrast, when the energy module is in a bypass mode, the internal electrical energy storage cells are bypassed such its terminals S1 and S2 are shortened to each other. In effect, no voltage from the energy storage cells is provided at terminal S1 or S2 of the energy module.

Particularly, an energy module 104 may provide the following operation modes: a Hi-Z (high impedance) mode in which module output S1, S2 is set to a high-impedance state (e.g., associated with none of the switches in the energy module being turned ON); a bypass mode in which the energy module is not contributing any voltage from its energy storage cells, but letting the current flow via it (e.g., between S1 and S2, via both low-side switches of the H-bridge being turned ON); a conducting + mode in which the energy storage cells are connected to the module output S1, S2 in a given polarity; and a conducting − mode in which the energy storage cells are connected to the module output S1, S2 in an opposite polarity as compared to the conducting + mode.

By successively transitioning the energy modules from the bypass mode to the battery mode, the combined output voltage of the energy modules 104 can be increased in steps. Similarly, by successively transitioning the energy modules from the battery mode to the bypass mode, the combined output voltage of the energy modules 104 can be decreased in steps. The combined output voltage can be changed by an amount equal to the output voltage $V_M$ of one energy module. Thus, the combined output voltage $V_C$ can vary between zero volts and X times $V_M$ Volts (i.e., 0 Volts<$V_C$<X·$V_M$ Volts). For obtaining finer transition between the $V_M$ steps, at least one energy module can be operated in a pulse-width-modulation ("PWM") mode with time varying duty-cycle. The combined output voltage $V_C$ can be smoothed by a signal conditioning circuit (e.g., filter 106) so as to produce a voltage signal at output port 108. The voltage signal (e.g., second AC power signal) at the output port 108 may have sinusoidal characteristics, DC signal characteristics or other waveform characteristics.

The electrical inverter 100 may also comprise an input port (not shown in FIG. 1) for storing energy in electrical energy storage (e.g., in at least some of the energy storage cells), e.g., by charging (or re-charging) the electrical energy storage. For example, the electrical energy storage may be charged by connecting grid AC power to the input port. Accordingly, the electrical inverter 100 may comprise at least one voltage sensor and/or current sensor which is used for sensing voltage at the input port, e.g., for charging the electrical energy storage with desired characteristics.

FIG. 2 provides an illustration of an energy module 104*a*. An assembly view of the energy module 104*a* is provided in FIG. 3. Energy modules 104*a*, 104*b*, . . . , 104*n* of FIG. 1 may be the same as or similar to the energy module shown in FIG. 2.

Energy module 104*a* comprises an energy module housing 202 in which electrical energy storage cells 300 are housed, e.g., so as to maintain certain positions relative to each other. The energy storage cells 300 can be arranged in two rows of three cells as shown in FIG. 3. The present solution is not limited in this regard. The electrical energy storage cells 300 can have a different arrangement than that shown in FIG. 3. Any number of electrical energy storage cells can be provided in the energy module 104*a* in accordance with a given application. Each energy storage cell may include, but is not limited to, a lithium-ion cell. Hence, the energy module 104*a* may comprise electrical energy storage cells which are in the form of an electrical battery, capacitor or supercapacitor, their likes or their combinations. The electrical energy storage cell, or lithium-ion cell, may have a cylindrical shape as shown or another shape (e.g., a rectangular shape) not shown.

A top cover 204 and a bottom cover 206 are provided for the energy module housing 202. The covers 204, 206 may be arranged to provide an environment seal with the housing 202. The environmental seal may be facilitated by gaskets (not visible or shown in FIGS. 2-3) compressed between the covers 204, 206 and the housing's sidewalls.

For safe and reliable operation of the energy module 104*a* there may be provided a monitoring of each electrical energy storage cell 300 to detect when its current, voltage and/or temperature fall outside of defined operating range(s). This monitoring may be achieved using a circuit 302 that is also housed in the energy module housing 202. Conductive terminals 304, 306, 308 are provided to connect the energy storage cells 300 to the circuit 302 e.g., for at least voltage measurements.

The energy module 104*a* also comprises a power out interface 210 for transferring electrical energy to/from the energy storage cells 300. Thus, the energy module 104*a* may receive electrical power via the power out interface 210 for charging the energy storage cells 300 (e.g., in a charge mode). The energy module 104*a* may provide electrical power via the power out interface 210, e.g., in a discharge mode. It shall be appreciated that the module terminals S1 and S2 may be part of the power out interface 210.

In some non-limiting aspects, the circuit 302 may also comprise an active bridge circuit for providing energy stored in the energy storage cells 300 at the power out interface 210.

FIG. 4 shows a block level illustrative diagram of the energy module 104*a*. The energy module 104*a* may comprise voltage and optionally, current sensors 416 connected to the one or more energy storage cells 300. These sensors 416 are configured to measure the voltage and/or current of each energy storage cell 300. Energy module 104*a* also comprises one or more temperature sensors 418 and a module temperature sensor 420. Each temperature sensor 418 is configured to measure a temperature of one or more energy storage cells 300, while the module temperature sensor 420 is configured to measure an internal temperature of the energy module 104*a*. These sensor measurements are communicated from the sensors 416, 418, 420 to a data processing circuit 404 for processing. The data processing circuit 404 can perform operations to communicate sensor measurements as sensor data to the control unit 102 or an external circuit, and/or perform operations to analyze the sensor measurements to determine if certain criteria is met. For example, if a parameter measurement falls outside of defined range at a given time or for a certain amount of time, then the data processing circuit 404 causes a selective interrupt circuit 406 to transition from a closed state to an open state such that the energy module 104*a* enters a safe state (e.g., the module 104*a* is turned off). The parameter measurement can include a voltage measurement, a current measurement or a temperature measurement.

The data processing circuit 404 may be configured to access datastore(s) 412. Datastore(s) 412 can comprise computer-readable storage medium on which is stored one or more sets of instructions configured to implement one or more of the methodologies, procedures, or functions described herein. The instructions can also reside, completely or at least partially, within the data processing circuit 404 during execution thereof by the data processing circuit 404. Datastore(s) 412 and data processing circuit 404 also can constitute machine-readable media. The term "machine-readable media", as used here, refers to a single medium or multiple media (e.g., a centralized or distributed database, and/or associated caches and servers) that store the one or more sets of instructions. The term "machine-readable media", as used here, also refers to any medium that is capable of storing, encoding or carrying a set of instructions for execution by the data processing circuit 404 and that cause the data processing circuit 404 to perform any one or more of the methodologies of the present disclosure. Data processing circuit 404 can include, but is not limited to, processor(s). Alternatively, or in addition, any or all of the instructions may be executed by the control unit 102. Thus, in some cases, the data processing circuit 404 may at least partially be a data acquisition processor, or an intermediary between control unit 102 and circuitry of the energy module 104*a*. Alternatively, or in addition, the data processing circuit 404 may be operatively connected to active bridge circuit 426 via one or more isolator(s) 414. The one or more isolator(s) 414 may even have an operative connection 424 used for other signals to/from or via the circuit 302. The operative connection between data processing circuit 404 and active bridge circuit 426 may be for data acquisition and/or the operative connection may be for driving the switching elements 402 (e.g., via isolated gate drivers). The data processing circuit 404 may even be operatively connected to other circuitry 408 of the energy module 104*a*. The other circuitry may be other sensors, switches or drivers.

Energy module 104*a* also comprises an active bridge circuit 426, which without limitation may be a transistor active bridge such as an H-bridge. The active bridge circuit 426 comprises at least one switching element (e.g., first switching element 402*a*, second switching element 402*b*, third switching element 402*c*, and/or fourth switching element 402*d*, collectively referred to as "switching elements 402," and individually referred to as "switching element 402"), first electrical connection S1, and second electrical connection S2.

In some non-limiting embodiments or aspects, switching elements 402 may be part of (e.g., integrated on, connected to, and/or the like) circuit 302. In some non-limiting embodiments or aspects, first electrical connection S1 and/or second electrical connection S2 may be part of (e.g., integrated on, connected to, and/or the like) the circuit 302 and/or may extend through top cover 204. The number and arrangement of components shown are provided as an example. In some non-limiting embodiments or aspects, energy module 104*a* may include additional components, fewer components, different components, or differently arranged components than those shown. Additionally or alternatively, a set of components (e.g., one or more components) of energy module 104*a* may perform one or more functions described as being performed by another set of components of the energy module 104*a*.

As shown in the example in FIG. 4, energy module 104*a* may include six energy storage cells 300 (e.g., rechargeable battery cells and/or the like) connected in series. In some non-limiting embodiments or aspects, energy storage cells 300 may be in other arrangements and/or have other connections, as described herein.

In some non-limiting embodiments or aspects, switching elements 402 may be switched (e.g., opened, closed, activated, deactivated, and/or the like) to selectively connect energy storage cells 300 to first electrical connection S1 and/or second electrical connection S2, e.g., to control a module voltage across first electrical connection S1 and second electrical connection S2. For example, switching elements 402 may be switched so that (1) first electrical connection S1 and second electrical connection S2 are both connected to negative side (e.g., DC minus) of energy storage cells 300, (2) first electrical connection S1 is connected to the negative side (e.g., DC minus) of energy storage cells 300 and second electrical connection S2 is connected to the positive side (e.g., DC plus) of energy storage cells 300, or (3) first electrical connection S1 is connected to the positive side (e.g., DC plus) of energy storage cells 300 and second electrical connection S2 is connected to the negative side (e.g., DC minus) of energy storage cells 300. As such, the voltage across first electrical connection S1 and second electrical connection S2 may be zero, negative, or positive, respectively.

For the purpose of illustration by way for a few examples, to connect both first electrical connection S1 and second electrical connection S2 to the negative side (e.g., DC minus) of energy storage cells 300, fourth switching element 402*d* and third switching element 402*c* may both be activated (e.g., closed, set to act as a closed switch, and/or the like), while second switching element 402*b* and first switching element 402*a* are deactivated (e.g., open, set to act as an open switch, and/or the like). To connect first electrical connection S1 to the negative side (e.g., DC minus) and connect second electrical connection S2 to the positive side (e.g., DC plus) of energy storage cells 300, fourth switching element 402*d* and second switching element 402*b* may be activated, while third switching element 402*c* and first switching element 402*a* are deactivated. To connect first electrical connection S1 to the positive side (e.g., DC plus) and second electrical connection S2 to the negative side (e.g., DC minus) of energy storage cells 300, first switching element 402*a* and third switching element 402*c* may be activated, and fourth switching element 402*d* and second switching element 402*b* may be deactivated. In some non-limiting embodiments or aspects, the switching elements 402 may be operated to be in states such as: a high-impedance (Hi-Z) state (e.g., in which all of the switching elements 402 are deactivated), a bypass state (e.g., in which the low-side switching elements 402*c* and 402*d* are activated while the high-side switching elements 402*a* and 402*b* are deactivated), and two polarity states (e.g., in which the energy storage cells 300 are connected between the first electrical connection S1 and the second electrical connection S2 in opposite polarity manner).

In some non-limiting embodiments or aspects, each switching element 402 may include at least one of a transistor (e.g., bipolar transistor, field-effect transistor (FET), metal-oxide-semiconductor field-effect transistor (MOSFET), and/or the like), a switch, a contactor, any combination thereof, and/or the like. In some non-limiting embodiments or aspects, the energy module 104*a* may include one or more driver circuits, such as a gate driver circuit, for driving each switching element 402. For example, the driver circuits may be part of (e.g., integrated on, connected to, and/or the like) circuit 302.

In some non-limiting embodiments or aspects, each switching element 402 may be driven, or controlled, via the circuit 302. For example, circuit 302 may control the switching elements 402 to selectively connect energy storage cells 300 to first electrical connection S1 and/or second electrical connection S2, as described herein. For example, circuit 302 may be connected to each switching element 402 in order to drive, or optionally control, such switching element 402. In some non-limiting embodiments or aspects, the circuit 302 provides signals to the gate driver circuit for driving the switching elements 402.

As shown, in some non-limiting aspects, the energy storage cells 300 may also be used to power the various internal components of the energy module 104*a*. For example, a high voltage line 410 (e.g., connected to + terminal of series connected energy storage cells 300) may be used to power not only the internal circuitry (e.g., circuit 302), but also provide output voltage via terminals S1, S2. Similarly, a low voltage line 422 (e.g., connected to − terminal of series connected energy storage cells 300) may be used to serve as a local reference (e.g., local ground) for the internal circuitry (e.g., circuit 302), but also provide output voltage via terminals S1, S2.

FIG. 5 shows a representation (symbol shown on the right-hand side in FIG. 5), which can be used to refer to each energy module 104 (e.g., for brevity and clarity of the following drawings) without any limitation to scope or generality of the present teachings.

Referring now to FIG. 6 and FIG. 7, shown are schematic diagrams of an example electrical inverter 100, according to some non-limiting embodiments or aspects. As shown in FIG. 6 and FIG. 7, electrical inverter 100 may include at least one module set, for example, a first module set 604*a* and/or a second module set 604*b*. Each of the module sets 604*a*, 604*b* are arranged in their own container. Each of the module sets 604*a*, 604*b* comprises a plurality of energy modules 104. The first module set 604*a* comprises energy modules 104*a*, 104*b*, and 104*c*. The second module set 604*b* comprises energy modules 104*d*, 104*e*, and 104*f*.

The electrical inverter 100 may also include electrical connection 612, communication connection 614, housing 120, control unit 102, input port 610 comprising at least one input connection (e.g., first input connection 606*a* and/or second input connection 606*b*, collectively referred to as "input connections 606," and individually referred to as "input connection 606"), output port 108 comprising at least one output connection (e.g., first output connection 608*a* and/or second output connection 608*b*, collectively referred to as "output connections 608," and individually referred to as "output connection 608"), and/or choke 618. As a non-limiting example, the first input connection 606*a* or the second input connection 606*b* may be a "line" input and the other input connection may be a "neutral" input. Similarly, as a non-limiting example, the first output connection 608*a* or the second output connection 608*b* may be a "line" output and the other output connection may be a "neutral" output.

In some non-limiting embodiments or aspects, electrical inverter 100 may also include at least one communications channel, which may be a wired and/or wireless connection (not shown in FIG. 6 or FIG. 7). The module sets 604 may be connected via electrical connection 612 and communication connection 614. For brevity and clarity, electrical connection 612 and communication connection 614 inside module sets 604 are not shown in FIG. 6, but energy modules 104 may be connected to electrical connection 612 and/or communication connection 614, as described herein. For brevity and clarity, connections between module sets 604 (and/or energy modules 104 thereof) and the input port 610 (or input connection(s) 606), the output port 108 (or output connection(s) 608), and/or communications channel are not shown in FIG. 6, but module set 604 (and/or and/or energy modules 104 thereof) may be connected to the input port 610 (or input connection(s) 606), output port 108 (or output connection(s) 608), and/or communication communications channel, as described herein. For brevity and clarity, connections between control unit 102 and input port 610 (or input connection(s) 606), output port 108 (or output connection(s) 608), and/or communications channel are not shown in FIG. 6, but control unit 102 may be connected to input port 610 (or input connection(s) 606), output port 108 (or output connection(s) 608), and/or communication communications channel, as described herein. The number and arrangement of components shown are provided as an example. In some non-limiting embodiments or aspects, electrical inverter 100 may include additional components, fewer components, different components, or differently arranged components than those shown. Additionally or alternatively, a set of components (e.g., one or more components) of electrical inverter 100 may perform one or more functions described as being performed by another set of components of electrical inverter 100. For example, in some non-limiting embodiments or aspects, choke 618 may be included in and/or a part of control unit 102.

In some non-limiting embodiments or aspects, housing 120 may include plastic, metal, any combination thereof, and/or the like. For example, housing 120 may include a metal housing, such as an aluminum housing.

In some non-limiting embodiments or aspects, housing 120 may be configured to hold at least one (e.g., a plurality of) module set(s) 604 and/or one or more (e.g., a plurality of) energy modules 104. For example, housing 120 may be configured to hold two module sets 604, three module sets 604, four module sets 604, and/or the like. For the purpose of illustration, housing 120 may be configured to hold two module sets 604, each of which may hold twelve energy modules 104 (e.g., a total of 24 energy modules 104). For the purpose of illustration, housing 120 may be configured to hold three module sets 604, each of which may hold eight energy modules 104 (e.g., a total of 24 energy modules 104). Other non-limiting configurations are also possible, e.g., housing 120 may hold four module sets 604, each of which may hold six energy modules 104 (e.g., a total of 24 energy modules 104). For the purpose of illustration, housing 120 may be configured to hold two module sets 604, each of which may hold three energy modules 104 (e.g., a total of 6 energy modules 104). In some non-limiting embodiments or aspects, module sets 604 and/or energy modules 104 may be in other arrangements within the housing 120.

In some non-limiting embodiments or aspects, housing 120 may include a plurality of compartments separated by dividers 616 (e.g., walls, barriers, and/or the like). For example, the number of compartments may be equal to the number of module sets 604 (e.g., a respective compartment for each respective module sets 604). Each compartment may be separated from the adjacent compartment(s) by a divider 616. For example, one divider 616 may separate an interior space of housing 120 into two compartments, two dividers 616 may separate an interior space of housing 120 into three compartments, and so on. In some non-limiting embodiments or aspects, divider 616 may be part of housing 120 and/or may include the same material as housing 120 (e.g., aluminum, metal, plastic, and/or the like).

In some non-limiting embodiments or aspects, as shown in FIG. 7, housing 120 may include body 702*a*, first end cap 702*b*, second end cap 702*c*, and/or at least one divider 616. In some non-limiting embodiments or aspects, body 702*a* and/or divider 616 may include a first material (e.g., metal, such as aluminum), and first end cap 702*b* and/or second end cap 702*c* may include a second material (e.g., plastic). In some non-limiting embodiments or aspects, at least one of first end cap 702*b* and/or second end cap 702*c* may include the same material as body 702*a* and/or divider 616. In some non-limiting embodiments or aspects, first end cap 702*b* and second end cap 702*c* may be configured to (e.g., sized and shaped to) cover openings at respective ends of body 702*a*.

In some non-limiting embodiments or aspects, first end cap 702*b* and/or second end cap 702*c* may include (and/or may have a space to accommodate) input port 610 (e.g., input connection(s) 606), output port 108 (e.g., output connection(s) 608), and/or communications channel (e.g., connector and/or wireless module). For the purpose of illustration, input port 610 (e.g., comprising input connection(s) 606) and communications channel (not shown in FIG. 7) may be located at first end cap 702*b*, and output port 108 (e.g., comprising output connection(s) 608) may be located at second end cap 702*c*. In some non-limiting embodiments or aspects, input port 610, output port 108, and/or communications channel may be in other arrangements. For example, all of input connection(s) 606, output connection(s) 608, and communications channel may be located at the same end cap (e.g., one of first end cap 702*b* or second end cap 702*c*). As another example, input port 610 (e.g., comprising input connection(s) 606) may be located at one end cap, and communications channel and output port 108 (e.g., comprising output connection(s) 608) may be located at the other end cap. As another example, input port 610 (e.g., comprising input connection(s) 606) and output port 108 (e.g., comprising output connection(s) 608) may be located at one end cap, and communications channel may be located at the other end cap. As another example, first output connection 608*a* may be located at one end cap, and second output connection 608*b* may be located at the other end cap.

In some non-limiting embodiments or aspects, control unit 102 may include a controller and associated circuitry. For example, control unit 102 may include a microcontroller, a computing device, a processor, a microprocessor, a digital signal processor (DSP), and/or any processing component (e.g., a field-programmable gate array (FPGA), an application-specific integrated circuit (ASIC), etc.) that can be configured to perform at least one function. In some non-limiting embodiments or aspects, control unit 102 may be communicatively connected to module set(s) 604 and/or energy module(s) 104 (e.g., circuit 302 and/or data processing circuit 404 thereof) by communication connection 614. In some non-limiting embodiments or aspects, control unit 102 may be electrically connected to module set(s) 604 and/or energy module(s) 104 (e.g., energy storage cells 300 thereof) by electrical connection 612. In some non-limiting embodiments or aspects, choke 618 may be included in and/or a part of control unit 102.

In some non-limiting embodiments or aspects, input port 610 may include (e.g., as one or more input connection(s) 606) at least one connector (e.g., at least one standardized electrical plug connector, e.g., for mains electric power and/or electrical devices compatible therewith). In some non-limiting embodiments or aspects, output port 108 may include (e.g., as one or more output connection(s) 608) at least one connector (e.g., at least one standardized electrical plug connector, e.g., for mains electric power and/or electrical devices compatible therewith). For example, first output connection 608*a* may include a connector (e.g., standardized electrical plug connector) suitable for 100-127 V (e.g., at a frequency of 60 Hz suitable for the United States of America, North America, etc.). For example, second output connection 608*b* may include a connector (e.g., standardized electrical plug connector) suitable for 200-240 V (e.g., at a frequency of 50 Hz suitable for the European Union, etc.). In some non-limiting embodiments or aspects, communications channel may include at least one connector (e.g., at least one standardized communication plug connector). For example, communications channel may include at least one of a universal serial bus (USB) connector (e.g., USB-A, USB-B, USB-C, USB power delivery (USB-PD), mini-USB, micro-USB, and/or the like), an ethernet connector, a coaxial cable connector, a pin connector, a CAN-bus connector, any combination thereof, and/or the like.

In some non-limiting embodiments or aspects, choke 618 may be electrically connected (e.g., coupled and/or the like) to module set(s) 604 and/or energy module(s) 104, as described herein. For example, a first module set 604*a* and/or a first group of energy modules 104 may be connected to a first connection (e.g., first end, first winding, and/or the like) of choke 618, as described herein. Additionally or alternatively, a second module set 604*b* and/or a second group of energy modules 104 may be connected to a second connection (e.g., second end, second winding, and/or the like) of choke 618, as described herein.

In some non-limiting embodiments or aspects, control unit 102 may command circuit 302 (e.g., data processing circuit 404) of energy modules 104 to generate an output voltage based on a combination (e.g., sum and/or the like) of the respective module voltage of each respective energy module 104, as described herein. For example, by sequentially connecting multiple energy modules 104 in series in a time-shifted manner, a combined (e.g., summed) voltage may approximate an AC voltage waveform having a target amplitude (e.g., a voltage substantially equal to the nominal voltage of mains electric power, such as 100-127 V, 200-240 V, and/or the like) and/or a target frequency (e.g., a frequency substantially equal to the nominal frequency of mains electric power, such as 60 Hz, 50 Hz, and/or the like), as described herein.

In some non-limiting embodiments or aspects, control unit 102 may command circuit 302 (e.g., data processing circuit 404) of energy modules 104 to cause a respective duty cycle of a respective module voltage of each respective energy module 104 to generate an output voltage based on a combination (e.g., sum and/or the like) of the respective module voltage of each respective energy module 104, as described herein. For example, by modulating the duty cycle differently for multiple energy modules 104 connected in series, a combined (e.g., summed) voltage may approximate (e.g., better approximate) an AC voltage waveform (e.g., the second AC power signal) having a target amplitude and/or a target frequency, as described herein. In some non-limiting embodiments or aspects, the duty cycle of the respective module voltage may relate to a switched voltage scheme such as a pulse-width modulation (PWM) type waveform. For example, control unit 102 may circuits 302 (e.g., data processing circuit 404 or other components) of energy modules 104 to switch their output voltage with certain frequency and/or duty-cycle. The exact number or range of the switching frequency is not essential to the scope or generality of the teachings of the present disclosure. As some non-limiting examples, the switching frequency of the system may be in the kHz range (1 kHz to 999 kHz). For example, the switching frequency and/or PWM frequency of the system may be between 40 kHz and 100 kHz. In some cases, the switching frequency and/or PWM frequency of the system may be at or around 90 kHz. In some non-limiting embodiments or aspects, module output may be switching (e.g., PWM) at a frequency between 1.5 kHz to 7.5 kHz. For example, module output may be switching (e.g., PWM) at a frequency between 3.5 kHz to 4.5 kHz. As a further example, module output may be switching (e.g., PWM) at a frequency at or around 3.75 kHz. As another example, module output may be switching (e.g., PWM) at a frequency at or around 4 kHz. In some non-limiting embodiments or aspects, the switching frequency or PWM frequency of the system may be proportional to a multiplication of the switching frequency and/or PWM frequency of the energy module 104 and the number of energy modules 104. It shall be appreciated that duty cycle may be anywhere between 0% and 100%, e.g., depending on the time at which the respective energy modules 104 are being operated. For example, 0% duty cycle for a given energy module 104 may mean that the energy module 104 is instructed to be deactivated or in a bypass mode (energy module 104 not contributing to the output voltage, but still able to carry current), and 100% duty cycle may mean that that energy module 104 is instructed to be switched on or activated in a given polarity. For example, by sweeping the duty cycle of a given energy module 104 over time (e.g., between 0% and 100%), the effective output voltage of that energy module 104 can be more finely incremented or decremented between voltage steps associated with full switching between two consecutive energy modules 104. Various energy modules 104 may be orchestrated, e.g., by control unit 102, to generate an output voltage based on a combination of the respective module voltage of each respective energy module 104, as described herein.

It shall be appreciated that the present teachings are not limited to the modular type electrical inverter 100 as discussed e.g., in FIG. 1-FIG. 6. Accordingly, the teachings can also be applied to the so-called "block inverters" or even to power supplies having AC output.

FIG. 8 shows an example connection diagram of a system or arrangement pursuant to the present teachings. As it applies to the rest of this disclosure, the aspects discussed herein can also be implemented as methods and software products.

FIG. 8 shows electrical inverter 100 with input port 610 and output port 108. A first AC power signal 804 is provided, e.g., via a first power source 810. The first power source 810 and the electrical inverter 100 may be independent of each other (e.g., when operating individually on their own, there is no defined relationship between the first power source 810 and the electrical inverter 100). In other words, either of the two power sources (the first power source 810 and the electrical inverter 100) can be activated or deactivated individually as needed without affecting usability of the other source.

The first power source 810 may, in some cases, be a wall socket which provides AC grid power as the first AC power signal 804. In other cases, the first power source 810 may be a stand-alone or independent source such as an engine generator, or even another electrical inverter. The another electrical inverter may be of the same type as the electrical inverter 100, or it may be of different type. The first AC power signal 804 may be a single-phase power signal.

The first AC power signal 804 is provided at the input port 610, where it may be measured e.g., via a voltage sensor of the electrical inverter 100. Optionally, there may even exist a communications channel 812 between the first power source 810 and the electrical inverter 100. The communications channel 812 may be wired and/or it may be wireless. In some non-limited aspects, the first AC power signal 804 may be encoded with high frequency communication signal (e.g., PLC), which is readable by the electrical inverter 100 and/or the first power source 810. Thus, in some cases, the communications channel 812 may at least partially be the same medium (e.g., connector and/or cable) which is used to connect the first power source 810 to the electrical inverter 100 to provide the first AC power signal 804 at the input port 610.

The electrical inverter 100 (e.g., a single-phase inverter, or an inverter operable to produce single-phase output) generates a second AC power signal 808 which is shifted by a pre-determined first phase-difference value relative to (e.g., from) the first AC power signal 804. To do so, for example, the electrical inverter 100 may generate a first tuned signal dependent upon the first AC power signal. The first tuned signal may be generated via a first oscillator in a way that the first tuned signal is dependent upon (e.g., proportional to) the first AC power signal 804. For doing so, the electrical inverter 100 may use the first tuned signal to determine a first phase value which is indicative of phase of the first AC power signal.

The first AC power signal 804 and the second AC power signal 808 which are in a proper phase relationship (shifted by the first phase-difference value relative to each other) may be provided at via and/or at a polyphase network 802 (e.g., a delta configuration, wye configuration, or their likes). Accordingly, a multi-phase AC output 806 may be provided, e.g., to power a multi-phase electrical load. The multi-phase AC output 806 may, for example, be a split-phase AC output.

It shall be appreciated that in FIG. 8 and some following FIGS., even though power signals such as the first AC power signal 804 and the second AC power signal 808 have been shown as a single line, any of the power signals may be carried by multiple electrical conductors (e.g., wires or cables). For example, the first AC power signal 804 may be provided via a two-wire conductor (e.g., a line wire and a neutral wire). Those with ordinary skills in the art know how to connect single-phase power signal, multi-phase power signals, and loads or different kinds. Connection specifics are thus not limiting to the scope or generality of the present teachings.

FIG. 9 shows another non-limiting example an aspect of the present teachings, which without limitation may be considered a further expansion of the aspect shown in FIG. 8.

In the configuration of FIG. 9, another electrical inverter 900 is connected to the electrical inverter 100 in a similar fashion as the electrical inverter 100 is connected to the first power source 810. In a sense, it may also be said that the another electrical inverter 900 is shown connected downstream of the electrical inverter 100. The connections between the first power source 810 and electrical inverter 100 are similar as shown in FIG. 8. The electrical inverter 100 and the another electrical inverter 900 are of the same type (e.g., the same model, or having similar functionality as proposed in the present disclosure).

As discussed in FIG. 8, the first power source 810, the electrical inverter 100, and the another electrical inverter 900 may be independent of each other (e.g., when operating individually on their own, there is no defined relationship between the first power source 810, the electrical inverter 100, or the another electrical inverter 900). In other words, either of the these power sources (the first power source 810, the electrical inverter 100, and the another electrical inverter 900) can be activated or deactivated individually as needed without affecting usability of the other source(s).

In addition to the connections as discussed in FIG. 8, the second AC power signal 808 is provided at input port 910 of the another electrical inverter 900, where it may be measured e.g., via a voltage sensor of the another electrical inverter 900. In another non-limiting aspect, which is not shown in FIG. 9, the first AC power signal 804 may be provided at the input port 910 of the another electrical inverter 900, additionally or alternatively to providing the second AC power signal 808 at the input port 910.

The another electrical inverter 900 (e.g., a single-phase inverter, or an inverter operable to produce single-phase output) generates a third AC power signal 904 which is shifted by a pre-determined second phase-difference value relative to the second AC power signal 808.

To do so, for example, the another electrical inverter 900 may generate another first tuned signal dependent upon the second AC power signal 808 (or in some cases, dependent upon the first AC power signal 804; as discussed in the following paragraph). The another first tuned signal may be generated via another first oscillator of another electrical inverter 900 in a way that the another first tuned signal is dependent upon (e.g., proportional to) the second AC power signal 808. For doing so, the another electrical inverter 900 may use the another first tuned signal to determine another first phase value which is indicative of phase of the second AC power signal 808.

Optionally, alternatively, without limitation to the scope or generality of the teachings, the pre-determined second phase-difference value (or any other phase-difference value), in some cases, may even be defined relative to the first AC power signal 804. In the latter case, for example, the first AC power signal 804 may be provided at input port 910 of the another electrical inverter 900, in addition or alternatively to the second AC power signal 808 being provided to the another electrical inverter 900. In such a case, the electrical inverter 100 and the another electrical inverter 900 may phase shift their respective power signals with different pre-defined phase-difference values relative to the first AC power signal 804. As a non-limiting example, the second AC power signal 808 may be phase shifted by a value of 120-degrees relative to the first AC power signal 804, while third AC power signal 904 is phase shifted by a value of 240-degrees relative to the first AC power signal 804. It shall be appreciated that the pre-determined second phase-difference value will still be 120-degrees relative to the second AC power signal 808.

Optionally, there may even exist a communications channel 812 between the another electrical inverter 900 and the first power source 810 and/or the electrical inverter 100. Possible non-limiting implementations of the communications channel 812 were already discussed in FIG. 8, which apply to FIG. 9 as well.

The first AC power signal 804, the second AC power signal 808, and the third AC power signal 904 which are in a proper phase relationship (shifted by the respective phase-difference values relative to each other, e.g., 120-degrees phase shifted relative to each other) may be provided at via and/or at a polyphase network 802 (e.g., a delta configuration, wye configuration, or their likes). Accordingly, a multi-phase AC output 906 may be provided, e.g., to power a multi-phase electrical load. The multi-phase AC output 906 may, for example, be a three-phase AC output.

It shall be appreciated that also in FIG. 9 even though power signals such as the first AC power signal 804, the second AC power signal 808, and the third AC power signal 904 have been drawn as a single line, any of the power signals may be carried by multiple electrical conductors (e.g., wires or cables). For example, the first AC power signal 804 may be provided via a two-wire conductor (e.g., a line wire and a neutral wire). Those with ordinary skills in the art know how to connect single-phase power signal, multi-phase power signals, and loads or different kinds. Connection specifics are thus not limiting to the scope or generality of the present teachings.

FIG. 10 shows another non-limiting example an aspect of the present teachings, which without limitation may be considered a further expansion of the aspect shown in FIG. 9, and even of FIG. 8.

In this case, the first power source is realized as a first electrical inverter 1000 which may be similar to (e.g., same as, or having similar functionality as) the electrical inverter 100 and the another electrical inverter 900. Accordingly, the first AC power signal 804 is provided via first output port 1008 of the first electrical inverter 1000. Rest of the aspects are similar to as were discussed in FIG. 9 and FIG. 8.

As it can be appreciated, the present teachings can provide a highly flexible approach to obtaining a multi-phase AC output, with similar kinds of electrical inverters or even with different power sources, e.g., the first power source 810, which is not have functionality of an electrical inverter as disclosed herein. Advantageously, the functionality can be provided to such an electrical inverter (e.g., electrical inverter 100, another electrical inverter 900, or first electrical inverter 1000 individually) such that the same electrical inverter can work stand-alone (e.g., single-phase operation), and work in tandem (e.g., automatically) with other electrical inverters and/or power sources when the input port is activated in the discharge mode.

FIG. 11 shows a block diagram 1100 pursuant to a non-limiting aspect of the present teachings for implementing one or more phase-difference value(s) (e.g., first phase-difference value). The functionality shown in the block diagram 1100 may be implemented at least partially in hardware form (e.g., circuitry, e.g., circuits 302 of the energy modules) and/or at least partially in software logic (e.g., computer readable instructions executable, e.g., by one or more control units 102). For example, the area 1126 in the block diagram 1100 may represent blocks which are implemented at least partially as software logic.

In the following discussion, for brevity and clarity, parts associated with the electrical inverter 100 will be referred to. It shall be appreciated that the discussion can apply to any electrical inverter pursuant to the present teachings. Accordingly, not only the electrical inverter 100, but also the another electrical inverter 900 and the first electrical inverter 1000, or any additional electrical inverter can be built with equivalent features.

An electrical inverter pursuant to the present teachings may include input circuit 1102, which may comprise input port 610 via which first AC power signal 804 having a first phase value may be provided. The first AC power signal 804 may, e.g., be measured at the input circuit 1102 and provided at a first phase detector 1104. The measured first AC power signal may either be identical to the first AC power signal 804, or it may be dependent upon (e.g., proportional to) the first AC power signal 804. The measured first AC power signal may also have the first phase value, or it may at least be in a fixed phase relationship to the first AC power signal 804.

According to a non-limiting aspect, either the input circuit 1102 and/or the first phase detector 1104 performs an orthogonal signal generation ("OSG") operation on the measured first AC power signal. The term OSG shall be understood in the art, and in this context it means generating 90-degree phase shifted components of the measured first AC power signal. For example, when the first AC power signal 804 is a sinusoidal signal, the OSG operation may involve generating a cosine component of the first AC power signal, i.e., two equivalent waveforms of the first AC power signal which are 90-degree phase shifted relative to each other.

According to a non-limiting aspect, the OSG operation on the first AC power signal 804 (e.g., the measured first AC power signal) involves passing the first AC power signal 804 or the measured first AC power signal through a filter-set. The filter-set may comprise a first filter and a second filter; where the first filter creates a first component of the measured first AC power signal having 0-degrees or essentially 0-degrees phase-shift, and the second filter creates a second component of the measured first AC power signal having 90-degrees or essentially 90-degrees phase-shift relative to the first component (or the measured first AC power signal). The filter-set may, e.g., be a second order low-pass filter series connected with a band-pass filter. The two components may be outputs of the two filters. Thus, the filter-set may generate two components for the first AC power signal 804 or the measured first AC power signal. For example, the first filter may be the bandpass filter, and the second filter may be the low-pass filter. As it was indicated previously, this OSG may at least partially be done in the input circuit 1102 and/or it may at least partially be done in the first phase detector 1104. Output of the first phase detector 1104, first phase detection signal 1138, is fed to a first controller 1106. According to a non-limiting aspect, the first controller 1106 is a proportional-integral ("PI") type controller. Output of the first controller 1106 is provided to error signal generator 1142 where it undergoes an error signal generation relative to a first setpoint signal 1122 which is provided at the error signal generator 1142 via a reference frequency generator 1112. The error signal 1144 is fed to a first oscillator 1108, which is operable to generate a first tuned signal 1128. It shall be appreciated that the first component and the second component may be termed an α-component and a β-component e.g., in context of a Park transformation operation (discussed below). It shall be appreciated that the filter-set may at least partially be included in input circuit 1102 and/or in the first phase detector 1104.

According to a non-limiting aspect, one or more parameters of the filter-set (e.g., parameters of the first filter and/or the second filter) are adjustable (e.g., in run-time, such as after each cycle or after certain number of cycles). As a non-limiting example, the filter-set parameters may be adjusted via input circuit control 1124.

According to a non-limiting aspect, the reference frequency generator 1112 is a fixed frequency, e.g., 50 Hz, or 60 Hz. According to a non-limiting aspect, the reference frequency generator 1112 is a variable frequency (e.g., adjustable frequency), which e.g., can be set or continuously adapted in response to the frequency of the first AC power signal 804.

According to a non-limiting aspect, the first oscillator 1108 is a numerically controlled oscillator ("NCO") which includes an accumulator or counter. According to a non-limiting aspect, the accumulator or counter has a pre-determined minimum value and a pre-determined maximum value within with the accumulator or counter cyclically operates. As a non-limiting example, the pre-determined minimum value may be 0. As a non-limiting example, the pre-determined maximum value may be 2047. Thus, the accumulator or counter may start from 0 and count up to 2027 and then reset back to 0. According to a non-limiting aspect, the NCO may produce the first tuned signal 1128 in sawtooth form having the pre-determined minimum value as a start value and the pre-determined maximum value as an end value in each cycle.

According to a non-limiting aspect, at the first phase detector 1104 and/or the first oscillator 1108 another OSG operation is performed in response to the first tuned signal 1128. According to a non-limiting aspect, a first lookup table ("LUT") is used to map the first tuned signal 1128 to a pair of orthogonal signals (or 90-degree phase shifted components, e.g., a sine component and a cosine component, e.g., as digital signals) which are provided as second OSG components.

According to a non-limiting aspect, the α-component, the β-component (related to the first AC power signal) and the second OSG components (related to the first tuned signal 1128) undergo a Park transformation operation, e.g., in the first phase detector 1104. The first phase detection signal 1138 may thus comprise a q-component generated as a result of the Park transformation operation. The first controller 1106 uses the q-component for minimizing the error signal (e.g., by adjusting start of the pre-determined minimum value) such that a first synchronized state is achieved.

It shall also be appreciated that the blocks and signal flow between first phase detector 1104, first controller 1106, first oscillator 1108 and back to the first phase detector 1104 forms a first control loop 1146 which adjusts the first tuned signal 1128 such that it can be in a desired relationship relative to the first AC power signal 804. For example, the first tuned signal 1128 may be adjusted to be in phase with the first AC power signal 804. The first tuned signal 1128 may be used to create a second AC power signal 808 a pre-determined first phase-difference value from the first phase value. For example, the first LUT or another LUT may be used to map the first tuned signal 1128 to a generation signal having the pre-determined first phase-difference value from the first tuned signal 1128, and the generation signal may be used to provide the second AC power signal 808, e.g., via an output circuit 1120. The output circuit 1120 may be connected to, or it may be included with, the output port 108 (not shown in FIG. 11).

According to an aspect, first phase lock signal 1130 may be generated which is indicative of the first synchronized state. The first phase lock signal 1130 is shown in this example as emanating via first oscillator 1108, but it may be provided via any part of the first control loop 1146 (e.g., first phase detector 1104, first controller 1106, or even via error signal generator 1142).

According to another non-limiting aspect, the first tuned signal 1128 is provided at a second phase detector 1114. The second phase detector 1114 outputs to a second controller 1116, which feeds to a second oscillator 1118. According to a non-limiting aspect, the second oscillator 1118 is similar to the first oscillator 1108. Particularly, both the first oscillator 1108 and the second oscillator 1118 may be NCOs with similar range (e.g., having the same pre-determined minimum value and pre-determined maximum value). An advantage of having similar NCOs is that phase detection operation (e.g., by second phase detector 1114) can be significantly simplified. For example, when both NCOs (first oscillator 1108 and second oscillator 1118) are producing similar tuned signals, the first tuned signal 1128 and the second tuned signal 1134 can be compared (e.g., subtractively) to achieve phase detection operation. For example, the first tuned signal 1128 and the second tuned signal 1134 may be combined substractively (e.g., one subtracted from the other) to achieve a comparison operation. Thus, according to a non-limiting aspect, a second phase detection signal 1150 via the second phase detector 1114 is generated in response to a subtractive operation between the first tuned signal 1128 and the second tuned signal 1134. The second phase detection signal 1150 is provided at a second controller 1116, which in some non-limiting aspects may also be a PI controller. The second tuned signal 1134 is generated in response to second controller output 1152. Thus, a second control loop 1148 is formed which operates to create a defined relationship between the phase values of the first tuned signal 1128 and the second tuned signal 1134. For example, via a phase offset signal 1132, the first phase-difference value may be achieved. There may be different ways in which the first phase-difference value can be achieved between the first AC power signal 804 and the second AC power signal 808. For example, the phase offset signal 1132 corresponding to the first phase-difference value may be added at (during, prior or after) the comparison (e.g., subtractive) operation between the first tuned signal 1128 and the second tuned signal 1134 such that the second control loop 1148 regulates the first phase-difference value between the first tuned signal 1128 and the second tuned signal 1134. It shall be appreciated that it will effectively also cause a similar phase relationship between first AC power signal 804 and second AC power signal 808. Alternatively, or in addition, second tuned signal 1134 may be used to select phase-shifted values from a second LUT. For example, the second LUT may map the second tuned signal 1134 to a sinusoidal signal which has the first phase-difference value relative to the second tuned signal 1134. Output circuit 1120 may then generate second AC power signal 808 in response to the sinusoidal signal. There may also be other ways to implement the first phase-difference value via other components of the second control loop 1148, all of which are encompassed in the present disclosure.

It shall be appreciated that instead of second control loop 1148 as shown in FIG. 11, a control loop similar to first control loop 1146 may be used without affecting the scope and generality of the present teachings. However, the second control loop 1148 as shown here is simpler as compared to the first control loop 1146, and can thus offer additional advantages such as reduced processing power, costs and implementation effort. Furthermore, in cases when the first phase lock signal 1130 is absent, the second oscillator 1118 may revert to operate in a free-running mode, e.g., at a fixed frequency reference value (e.g., at or around grid frequency, e.g., 50 Hz, or 60 Hz) such that when the electrical inverter pursuant to the present teachings is not used in combination with other power sources, it generates single-phase power without need for synchronizing to any signal. Advantageously, the present teachings can allow electrical inverter to automatically transition between these modes.

It shall be appreciated that in some non-limiting aspects, at least one electrical inverter pursuant to the present teachings may be enclosed in a common housing, enclosure or fixture with at least one other power source which may or may not be another electrical inverter. For example, the electrical inverter 100, the first electrical inverter 1000 and the another electrical inverter 900 may be included in a common housing, enclosure or fixture as a multi-phase electrical system. For example, these three electrical inverters may be arranged as or via a polyphase network 802 to provide three-phase power. An advantage of doing so can be that in production, single-phase units can be assembled together to realize a multi-phase electrical system. The same units may even be sold as single-phase units. That can make production of the electrical inverters more scalable, and simplify the supply chain. It shall be appreciated that the present teachings can also allow a similar arrangement with at least one other kind of power source. For example, an engine-based generator may be provided with at least one electrical inverter pursuant to the present teachings to achieve multi-phase AC output on demand. Thus, there can be several industrial as well as economical advantages by leveraging the present teachings.

FIG. 12 shows a flowchart 1200, which may be implemented e.g., as computer readable instructions, which may be executed e.g., via one or more control units 102 as disclosed herein or via other computer processors.

In 1202, it may be measured, e.g., via an input port 610, a first AC power signal 804. In 1204, it is generated, e.g., via a first oscillator 1108, a first tuned signal 1128 dependent upon the first AC power signal 804. In 1206, it is determined, using the first tuned signal 1128, a first phase value. The first phase value is indicative of phase of the first AC power signal 804. In 1208, it is generated, a second AC power signal 808 which is shifted by a pre-determined first phase-difference value from the first phase value.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above-described scenarios. Rather, the scope of the present solution should be defined in accordance with the following claims and their equivalents.

For example, the present teachings relate to methods of operating an electrical inverter operable to deliver AC electrical power as a second AC power signal, the method comprising: measure a first AC power signal; generating a first tuned signal dependent upon the first AC power signal; determining, using the first tuned signal, a first phase value indicative of phase of the first AC power signal; generating the second AC power signal shifted by a pre-determined first phase-difference value from the first phase value. The present teachings also disclose related products, systems, and software. For example, it is disclosed systems comprising means for performing the herein disclosed methods (e.g., executing steps of any of the herein disclosed methods). It is also disclosed software comprising instructions which when executed via a suitable system, cause the system to perform the herein disclosed methods (e.g., executing steps of any of the herein disclosed methods). It shall be appreciated that the inverter or related systems or methods as proposed may either be realized as standalone products, or they may be part of a larger system (e.g., a hybrid vehicle, an electric vehicle ("EV"), machine, power tool, or their likes). For example, it is disclosed a system or arrangement (e.g., a vehicle, a power tool, any other types or their likes) comprising at least one or more of the herein disclosed electrical inverters.

Without excluding further possible embodiments, certain example embodiments are summarized in the following clauses:

Clause 1. A method of operating an electrical inverter or inverter unit comprising the inverter (e.g., a portable inverter unit) in a discharge mode in which the electrical inverter is operable to deliver AC electrical power as a second AC power signal (e.g., via an output port), which AC electrical power is derived from energy stored in an electrical energy storage, the method comprising:
- measure, via an input port (e.g., of the inverter), a first AC power signal;
- generate, via a first oscillator (e.g., of the inverter), a first tuned signal dependent upon the first AC power signal;
- determining (e.g., via the inverter), using the first tuned signal, a first phase value, wherein the first phase value is indicative of phase of the first AC power signal;
- generating (e.g., at an output of the inverter) the second AC power signal which is shifted by a pre-determined first phase-difference value from the first phase value.

Clause 1a. The method of Clause 1, wherein the electrical inverter comprises:
- the electrical energy storage;

the input port which is operable in a charge mode to receive electrical power for charging the electrical energy storage; and an output port operable to deliver the second AC power signal, wherein the method comprises:

powering the electrical load using the first AC power signal and the second AC power signal.

Clause 1b: A method of operating an electrical inverter (or an inverter unit comprising the inverter) (e.g., a portable inverter unit) in a discharge mode, the electrical inverter comprising:

an electrical energy storage;

an input port operable, in a charge mode, to receive electrical power for charging the electrical energy storage; and an output port operable, in the discharge mode, to deliver AC electrical power as a second AC power signal, the AC electrical power being sourced from the electrical energy storage, which method comprises:

measuring, via the input port, a first AC power signal;

generating, via a first oscillator, a first tuned signal dependent upon the first AC power signal;

determining, using the first tuned signal, a first phase value, wherein the first phase value is indicative of phase of the first AC power signal;

generating the second AC power signal which is shifted by a pre-determined first phase-difference value from the first phase value.

Clause 2. The method of clause 1 or 1b, further including:

powering an electrical load using the first AC power signal and the second AC power signal.

Clause 3. The method of clause 1, 1a, 1b, or 2, wherein the first phase-difference value is 120 degrees or thereabouts.

Clause 4. The method of any one of clauses 1 to 3, wherein determining of the first phase value involves:

generating a first phase lock signal indicative of a first synchronized state between the first tuned signal and the first AC power signal;

providing, via a second oscillator, a second tuned signal;

phase locking the second tuned signal to the first tuned signal when the first phase lock signal is active, using the second tuned signal to generate the second AC power signal.

Clause 5. The method of any one of clauses 1 to 4, wherein the electrical inverter is also operable in a charge mode in which the electrical inverter receives electrical power, present at the input port, for charging the electrical energy storage.

Clause 6. The method of any one of clauses 1 to 5, wherein the electrical inverter includes switches arranged as an H-bridge.

Clause 7. The method of any one of clauses 1 to 6, wherein the electrical inverter comprises a plurality of energy modules, and wherein at least one (preferably each) energy module comprises an inverter circuit and at least one rechargeable electrical energy storage cell. E.g., the electrical energy storage comprises the at least one rechargeable electrical energy storage cell.

Clause 8. The method of clause 7, wherein the inverter circuit of at least some of the energy modules comprises an H-bridge.

Clause 9. The method of clause 7 or 8, wherein at least some of the energy modules are connected in parallel.

Clause 10. The method of any one of clauses 7 to 9, wherein at least some of the energy modules are serially connected.

Clause 11. The method of any one of clauses 1 to 10, wherein the first AC power signal is provided by a first power source.

Clause 12. The method of clause 11, wherein the first power source is communicatively connected to the electrical inverter via a communications channel.

Clause 13. The method of clause 12, wherein the communications channel comprises power line communication between the first power source and the electrical inverter.

Clause 14. The method of clause 12 or 13, wherein the communications channel is at least partially wireless.

Clause 15. The method of any one of clauses 12 to 14, wherein the communications channel is at least partially a wired digital bus.

Clause 16. The method of any one of clauses 11 to 15, wherein the first power source is AC mains grid.

Clause 17. The method of any one of clauses 11 to 15, wherein the first power source is a power generator, such as an engine generator.

Clause 18. The method of any one of clauses 11 to 15, wherein the first power source is another electrical inverter, preferably having similar functionality as the electrical inverter.

Clause 19. The method of any one of clauses 1 to 18, wherein determining of the first phase value involves:

using the first tuned signal to pick values from a first lookup table to generate first orthogonal signals;

performing a first Park transformation operation using the first orthogonal signals to obtain the first phase value.

Clause 20. The method of any one of clauses 1 to 19, wherein determining of the first phase value involves:

generating second orthogonal signals by processing the first AC power signal via a filter set;

performing a first Park transformation operation using the second orthogonal signals to obtain the first phase value.

Clause 21. The method of any one of clauses 1 to 20, wherein generating the second AC power signal further comprises:

using the second tuned signal to pick values from a second lookup table to generate a second AC waveform;

generating the second AC power signal dependent upon the second AC waveform.

Clause 22. The method of any one of clauses 1 to 21, wherein the first tuned signal and the second tuned signal are digital sawtooth signals spanning between a pre-determined minimum value and a pre-determined maximum value.

Clause 23. The method of clause 22, wherein the pre-determined minimum value is 0 and the pre-determined maximum value is 2047.

Clause 24. The method of any one of clauses 1 to 23, wherein the first oscillator is a digital logic, e.g., a digital phase locked loop logic involving phase detection based on a Park transformation logic.

Clause 25. The method of any one of clauses 1 to 24, wherein the first phase-difference value is established via the second oscillator.

Clause 26. The method of any one of clauses 1 to 25, wherein the second oscillator is controlled via a second proportional-integral controller for controlling [e.g., frequency locking] the second tuned signal in such a way that the second AC power output stays offset with the first phase-difference value with respect to the first AC power signal.

Clause 27. The method of any one of clauses 1 to 26, wherein at least the first AC power signal and the second AC power signal are provided at a polyphase network such as a delta circuit or a wye circuit.

Clause 28. A system comprising means for performing the steps of any one of clauses 1 to 27.

Clause 29. A software product comprising computer-readable instructions which when executed by one or more suitable processing units cause any of the processing units to perform the steps of any one of clauses 1 to 27.

Clause 30. An electrical inverter comprising:
- an input port operable, in a charge mode, to receive electrical power for charging an electrical energy storage; and
- an output port operable, in a discharge mode, to deliver AC electrical power as a second AC power signal, the AC electrical power being sourced from the electrical energy storage;
- wherein the electrical inverter is further operable in the discharge mode to:
- measure a first AC power signal provided at the input port;
- generate, via a first oscillator, a first tuned signal dependent upon the first AC power signal;
- determining a first phase value, wherein the first phase value is indicative of phase of the first AC power signal;
- generating the second AC power signal which is shifted by a pre-determined first phase-difference value from the first phase value.

Clause 31. A method of operating an electrical inverter in a discharge mode in which the electrical inverter is operable to deliver AC electrical power as a second AC power signal via an output port, which AC electrical power is derived from energy stored in an electrical energy storage, the method comprising:
- measure, at an input port, a first AC power signal;
- generate, via a first oscillator, a first tuned signal dependent upon the first AC power signal;
- generating a first phase lock signal indicative of a first synchronized state between the first tuned signal and waveform of the first AC power signal;
- providing, via a second oscillator, an adjustable frequency second tuned signal; wherein the second tuned signal is phase locked to the first tuned signal when the first phase lock signal is active;
- generating, using the second tuned signal, the AC electrical power which is shifted by a pre-determined first phase-difference value from phase of the first AC power signal.

Clause 32. The method of clause 31, wherein the electrical inverter is also operable in a charge mode in which the electrical inverter receives electrical power, at the input port, for charging the electrical energy storage.

Clause 33. An electrical system comprising means for performing the steps of any one of clauses 31 to 32.

Clause 34. A software product comprising computer-readable instructions which when executed by one or more suitable processing units cause any of the processing units to perform the steps of any one of clauses 31 to 32.

Clause 35. A method of multiphase AC output generation, comprising:
- providing, via a first power source, a first AC power signal;
- providing, via a second power source, a second AC power signal; and
- combining the first AC power signal and the second AC power signal to obtain the multiphase AC power output,
- wherein the second power source is operable to provide the second AC power signal with a second phase value which is shifted by a pre-determined first phase-difference value from a first phase value of the first AC power signal, and wherein at least the second AC power signal is off-grid type.

Clause 36. The method of clause 35, further comprising:
- providing, via a third power source, a third AC power signal; and
- obtaining the multiphase AC power output by combining the first AC power signal, the second AC power signal and the third AC power signal, wherein
- the third power source is operable to provide the third AC power signal with a third phase value which is shifted by a pre-determined amount from the first phase value and/or the second phase value, and wherein the third AC power signal is off-grid type.

Clause 37. A method of multiphase AC output generation, comprising:
- providing, via a first power source, a first AC power signal;
- providing, via a second power source, a second AC power signal;
- providing, via a third power source, a third AC power signal; and
- combining the first AC power signal, the second AC power signal and the third AC power signal to obtain the multiphase AC power output (e.g., three-phase power output),
- wherein the second power source is operable to provide the second AC power signal with a second phase value which is shifted by a pre-determined first phase-difference value from a first phase value of the first AC power signal, and wherein the third power source is operable to provide the third AC power signal with a third phase value which is shifted by a pre-determined amount from the first phase value and/or the second phase value, and wherein at least the second AC power signal and the third AC power signal are off-grid type.

Clause 38. The method of any one of clauses 35 to 37, wherein each of the power sources is self-contained or independent of the other power sources.

Clause 39. The method of any one of clauses 35 to 38, wherein at least one of the power sources is operable to provide its AC power output independent of (without) other of the power sources.

Clause 40. The method of any one of clauses 36 to 39, wherein at least the second power source and the third power source each comprise an electrical inverter via which the second AC power signal and third AC power signal is respectively provided.

Clause 41. The method of any one of clauses 35 to 40, wherein the first AC power source is AC mains grid power.

Clause 42. The method of any one of clauses 35 to 40, wherein the first AC power source is fuel-based power generator.

Clause 43. The method of any one of clauses 35 to 42, wherein at least one of the AC power sources is power unit comprising one or more inverters and rechargeable electrical energy storage.

Clause 44. The method of clause 43, wherein the power unit comprises a plurality of energy modules, and wherein each energy module comprises an inverter and at least one rechargeable electrical energy storage cell.

Clause 45. The method of any one of clauses 42 to 44, wherein at least one of the inverters is an H-bridge inverter.

Clause 46. The method of any one of clauses 43 to 45, wherein at least some of the inverters are operable in a series connection to provide off-grid AC power output.

Clause 47. The method of any one of clauses 43 to 46, wherein at least some of the inverters are operable in a parallel connection to provide off-grid AC power output.

Clause 48. The method of any one of clauses 35 to 43, wherein the second phase value is determined in response to a detection of the first phase value, e.g., by detecting the first phase value; and determining the second phase value such that the second phase value differs from the first phase value by the pre-determined first phase-difference value.

Clause 49. The method of any one of clauses 35 to 48, wherein the second power source is operable to provide the second AC power output by:

e.g., providing the first AC power signal or a signal dependent upon the first AC power signal at an input of the second power source;

generating, via a first oscillator, a first tuned signal dependent upon the first AC power output;

generating a first phase lock signal indicative of the a first synchronized state between the first tuned signal and waveform of the first AC power signal;

providing, via a second oscillator, an adjustable frequency second tuned signal; wherein the second tuned signal is phase locked to the first tuned signal when the first phase lock signal is active;

generating, using the second tuned signal, the second AC power output.

Clause 50. The method of clause 49, wherein generating the second AC power output further comprises:

using the second tuned signal to pick values from a first lookup table to generate a first AC waveform;

generating the second AC power output dependent upon the first AC waveform.

Clause 51. The method of clause 49 or 50, wherein the first tuned signal and the second tuned signal are digital sawtooth signals spanning between a pre-determined minimum value and a pre-determined maximum value.

Clause 52. The method of clause 51, wherein the pre-determined minimum value is 0 and the pre-determined maximum value is 2047.

Clause 53. The method of any one of clauses 49 to 52, wherein the first oscillator is a digital logic, e.g., a digital phase locked loop logic involving phase detection based on a Park transform logic.

Clause 54. The method of any one of clauses 49 to 53, wherein the first phase-difference value is established via the second oscillator.

Clause 55. The method of any one of clauses 49 to 54, wherein the second oscillator is controlled via a proportional-integral controller for controlling [frequency locking] the second tuned signal in such a way that the second AC power output stays offset with the first phase-difference value with respect to the first AC power signal.

Clause 56. The method of any one of clauses 35 to 55, wherein at least the first AC power signal and the second AC power signal are provided at a polyphase network such as a delta circuit or a wye circuit.

Clause 57. An inverter unit comprising means for performing the steps of any one of the above method Clauses.

Clause 58. An arrangement for multiphase AC power generation comprising at least two electrical inverters or inverter units according to any of the above clauses.

Clause 59. A kit comprising at least two electrical inverters or inverter units according to any of the above clauses.

Clause 60. A system comprising means for performing the steps of any of the above method clauses.

The invention claimed is:

1. A method of operating an electrical inverter in a discharge mode in which the electrical inverter is operable to deliver AC electrical power as a second AC power signal, which AC electrical power is derived from energy stored in an electrical energy storage, wherein the electrical inverter comprises the electrical energy storage and an input port for receiving electrical power for charging the electrical energy storage, the method comprising:

measuring, via the input port, a first AC power signal received at the input port;

generating, via a first oscillator, a first tuned signal dependent upon the first AC power signal;

determining, using the first tuned signal, a first phase value, wherein the first phase value is indicative of phase of the first AC power signal; and generating the second AC power signal which is shifted by a pre-determined first phase-difference value from the first phase value.

2. The method of claim 1, wherein the electrical inverter further comprises:

an output port operable to deliver the second AC power signal, and wherein the method further comprises powering an electrical load using the first AC power signal and the second AC power signal.

3. The method of claim 1, wherein determining the first phase value comprises:

generating a first phase lock signal indicative of a first synchronized state between the first tuned signal and the first AC power signal;

providing, via a second oscillator, a second tuned signal;

phase locking the second tuned signal to the first tuned signal when the first phase lock signal is active; and using the second tuned signal to generate the second AC power signal.

4. The method of claim 1, wherein the electrical inverter further comprises a plurality of energy modules, and wherein at least one energy module comprises an inverter circuit and at least one rechargeable electrical energy storage cell.

5. The method of claim 1, wherein the first AC power signal is provided by a first power source, wherein the first power source is AC mains grid or an engine generator.

6. The method of claim 1, wherein the first AC power signal is provided by a first power source, wherein the first power source is a second electrical inverter operable to deliver AC electrical power derived from energy stored in an electrical energy storage of the second inverter.

7. The method of claim 1, wherein determining the first phase value comprises:

using the first tuned signal to pick values from a first lookup table to generate first orthogonal signals; and performing a first Park transformation operation using the first orthogonal signals to obtain the first phase value.

8. The method of claim 1, wherein determining the first phase value comprises:

generating second orthogonal signals by processing the first AC power signal via a filter set; and performing a first Park transformation operation using the second orthogonal signals to obtain the first phase value.

9. The method of claim 3, wherein generating the second AC power signal further comprises:

using the second tuned signal to pick values from a lookup table to generate a second AC waveform;

generating the second AC power signal dependent upon the second AC waveform.

10. The method of claim 3, wherein the first tuned signal and the second tuned signal are digital sawtooth signals spanning between a pre-determined minimum value and a pre-determined maximum value.

11. The method of claim 3, wherein the first phase-difference value is established via the second oscillator.

12. The method of claim 3, wherein the second oscillator is controlled via a second proportional-integral controller for controlling the second tuned signal such that the second AC power output stays offset with the first phase-difference value with respect to the first AC power signal.

13. An electrical inverter operable in a discharge mode and a charge mode, the electrical inverter comprising:

an input port operable to receive a first AC power signal;

an electrical energy storage; and an output port, wherein, in the discharge mode, the electrical inverter is operable to:

measure the first AC power signal received at the input port;

generate, via a first oscillator, a first tuned signal dependent upon the first AC power signal;

determine a first phase value, wherein the first phase value is indicative of phase of the first AC power signal;

generate a second AC power signal which is shifted by a pre-determined first phase-difference value from the first phase value; and deliver AC electrical power as the second AC power signal, wherein the AC electrical power is sourced from the electrical energy storage, and wherein, in the charge mode, the input port is operable to receive electrical power for charging the electrical energy storage.

14. The electrical inverter of claim 13, further comprising a plurality of energy modules, wherein at least one energy module comprises an inverter circuit and at least one rechargeable electrical energy storage cell.

15. The electrical inverter of claim 13, wherein, in the discharge mode, the electrical inverter is further operable to:

generate a first phase lock signal indicative of a first synchronized state between the first tuned signal and the first AC power signal;

provide, via a second oscillator, a second tuned signal;

phase lock the second tuned signal to the first tuned signal when the first phase lock signal is active; and use the second tuned signal to generate the second AC power signal.

16. The electrical inverter of claim 13, wherein, in the discharge mode, the electrical inverter is further operable to:

use the first tuned signal to pick values from a first lookup table to generate first orthogonal signals; and perform a first Park transformation operation using the first orthogonal signals to obtain the first phase value.

17. An electrical system for powering a load, comprising:

the electrical inverter of claim 13; and a first power source for providing the first AC power signal, wherein the electrical system is operable to provide the first AC power signal and the second AC power signal to the load.

18. The electrical system of claim 17, wherein the first power source is AC mains grid or an engine generator.

19. The electrical system of claim 17, wherein the first power source is a second electrical inverter operable to deliver AC electrical power derived from energy stored in an electrical energy storage of the second inverter.

20. A non-transitory computer-readable storage medium comprising programming instructions stored thereon, wherein, when executed by a processor, the programming instructions cause an electrical inverter to operate in a discharge mode in which the electrical inverter is operable to deliver AC electrical power as a second AC power signal which AC electrical power is derived from energy stored in an electrical energy storage of the electrical inverter, and in a charge mode wherein the electrical inverter receives electrical power for charging the electrical energy storage, wherein, in the discharge mode, the programming instructions cause the electrical inverter to perform the steps of:

measuring a first AC power signal received at an input port of the electrical inverter;

generating, via a first oscillator, a first tuned signal dependent upon the first AC power signal;

determining, using the first tuned signal, a first phase value, wherein the first phase value is indicative of phase of the first AC power signal; and generating the second AC power signal which is shifted by a pre-determined first phase-difference value from the first phase value.

* * * * *